(12) United States Patent
Hannu et al.

(10) Patent No.: US 8,081,975 B2
(45) Date of Patent: Dec. 20, 2011

(54) UPLINK ACCESS MANAGEMENT

(75) Inventors: Hans Hannu, Luleå (SE); Tomas Jönsson, Luleå (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 330 days.

(21) Appl. No.: 12/517,170

(22) PCT Filed: Jan. 15, 2007

(86) PCT No.: PCT/SE2007/050020
§ 371 (c)(1),
(2), (4) Date: Jun. 1, 2009

(87) PCT Pub. No.: WO2008/066467
PCT Pub. Date: Jun. 5, 2008

(65) Prior Publication Data
US 2010/0069064 A1    Mar. 18, 2010

Related U.S. Application Data

(60) Provisional application No. 60/861,985, filed on Dec. 1, 2006.

(51) Int. Cl.
*H04W 4/00* (2009.01)
(52) U.S. Cl. ......... 455/434; 455/450; 370/329; 370/341
(58) Field of Classification Search .................. None
See application file for complete search history.

(56) References Cited

U.S. PATENT DOCUMENTS

| 6,707,808 | B1* | 3/2004 | Vedrine | 370/337 |
|---|---|---|---|---|
| 2005/0053029 | A1* | 3/2005 | Lee et al. | 370/328 |
| 2009/0258647 | A1* | 10/2009 | Yamada et al. | 455/435.1 |
| 2009/0323624 | A1* | 12/2009 | Kim | 370/329 |
| 2010/0226263 | A1* | 9/2010 | Chun et al. | 370/252 |

FOREIGN PATENT DOCUMENTS

| WO | WO 2007040978 A2 | 4/2007 |
|---|---|---|
| WO | WO 2007102060 A2 | 9/2007 |
| WO | WO 2007116227 A1 | 10/2007 |

\* cited by examiner

*Primary Examiner* — Ajit Patel
(74) *Attorney, Agent, or Firm* — Roger S. Burleigh

(57) ABSTRACT

The invention involves uplink access management for user terminals (210, 220, 230, 240, 250, 260, 270) present in a same first cell (15) of a communication system (1) and participating in a communication session involving communication of user data on a common downlink channel to the terminals (210, 220, 230, 240, 250, 260, 270). When the terminals (210, 220, 230, 240, 250, 260, 270) want to respond to the user data transmission, they first have to request uplink access. According to the invention, at least one of the terminals (220, 230, 240) requests this uplink access using a request channel associated with a second (25, 35, 45) cell different from the current first cell (15). This reduces the risk of collision of uplink access requests on the request channel by distributing the requests over several cells (15, 25, 35, 45) instead of a single cell (15).

34 Claims, 12 Drawing Sheets

UPLINK ACCESS MANAGEMENT

This application claims the benefit of U.S. Provisional Application No. 60/861,985, filed Dec. 1, 2006, the disclosure of which is incorporated herein by reference.

TECHNICAL FIELD

The present invention generally relates to communication session management in cellular communications systems, and in particular to managing uplink access in such systems.

BACKGROUND

The cellular industry is constantly seeking new ways for improving how people communicate. With the introduction of EDGE (Enhanced Data rates for GSM Evolution) technology [1] for GSM (Global System for Mobile communications) and the HSDPA (High Speed Downlink Packet Access) [2] for WCDMA (Wideband Code Division Multiple Access) the data communication in cellular terminals has reached new heights. The IMS (IP Multimedia Subsystem) [3] gives new opportunities to create additional interesting IP based services, such as PoC (Push to talk Over Cellular) [4]. MBMS (Multimedia Broadcast Multicast Service) [5] is yet another feature which allows for efficient deployment of broadcast and multicast services, such as mobile TV. This is true as MBMS offers true broadcast and multicast even over the radio. For example users, or actually user terminals, in GSM/(E)GPRS ((Enhanced) General Packet Radio Services) would listen to the same time slots carrying the MBMS data channel.

With the above in mind it is obvious that cellular system used for traditional mobile telecommunication and data communication is starting to become a highly attractive alternative to the analogue PMR (Public Mobile Radio) and PSR (Public Safety Radio) system, used by e.g. police departments, fire departments, ambulance personnel, security and transport companies.

One service included in a PMR or PSR system based on commercial available cellular technologies, as given above, would be PoC using MBMS to support large communication groups. This would enable an attractive PMR/PSR service highly useful for example by firemen, taxi drivers and the other above-identified potential users.

When a user has made a multicast or broadcast call to multiple users of the IMS service/application, such as PoC service, some of these listening users might want to respond to the message by sending a multicast or broadcast message himself/herself. In MBMS, uplink resources useful for these users must first be requested before the data can be transmitted to the base station and multicast/broadcast to the other users of the IMS service. In the art, at least one RACH (Random Access Channel) channel is available in the cell and can be used by user terminals for transmitting uplink access request message. Access to RACH channel is commonly done according to standard procedure as described in [6].

The document [6] specifies that user terminal shall send UPLINK ACCESS messages on the voice group call channel with the appropriate establishment cause. The first UPLINK ACCESS message shall be transmitted by the user terminal with a random delay between 0 and 20 ms. If the user terminal is not granted any uplink resources (uplink access), the UPLINK ACCESS messages shall be repeated after a further period of 100 ms plus a random delay between 0 and 20 ms. The UPLINK ACCESS messages contain a random reference which is drawn randomly from a uniform probability distribution. The UPLINK ACCESS messages repetitions shall contain the same random reference as the one contained in the first message.

Although there is randomness in generation of the access request, the collision probability i.e. blocking on the RACH, is considerable when employing multicast/broadcast signalling for IMS services, such as PoC. This problem will be particularly prominent at the end of a previously sent downlink (multicast/broadcast) message. At that point of the communication session, a large amount of the participating users might want to respond to the downlink message and all these users would then almost simultaneously or at least within a small time window transmit uplink access requests on the RACH channel(s).

One scenario example is when a commander in chief gives instructions which require people to respond. Another one is the warnings of hazards that can be shouted out during firemen putting out fires, etc. A third example is during major sport events such as world football (soccer) cup, when both audience and police can use PoC/PMR/PSR for communication.

There will therefore be RACH access limitations due to the large number of groups members located in the same area (cell). Since many channel access requests are transmitted during a short time period, for example after MBMS data transmission, there may be a problem to get anything through and no or few of the group members will be allocated any uplink resources. As a result only few, if any, of the members wanting to respond to a message or transmit data will be able to do this.

SUMMARY

The present invention overcomes these and other drawbacks of the prior art arrangements.

It is a general object of the present invention to provide a management of a multi-user communication session.

It is a particular object of the invention to provide an efficient uplink medium access in such a multi-user communication session.

These and other objects are met by the invention as defined herein.

Briefly, the present invention involves a communication session involving multiple participating user terminals present in a same first cell or radio-coverage area of a communication system. The session involves transmission of user data originating from a participating terminal to the terminals in the first cell using a common downlink channel. If the user terminals would like to transmit data of their own, they must first be assigned an uplink unicast channel in an uplink medium access procedure. This procedure involves transmission of uplink access requests from the terminals, typically on request channels. In order to prevent blocking and collisions of a multitude of such simultaneous or near simultaneous uplink access requests on the request channel of the first cell from the multiple user terminals present therein, the invention teaches that at least one of these multiple user terminals should transmit its uplink access request using the request channel of another, typically neighbor or adjacent, cell. This results in a distribution of the multitude of uplink access requests over several cells and request channels as compared to a single cell and single channel. The collision and blocking risks are reduced, which results in faster uplink access.

The invention also teaches selection of user terminals that are to use the request channels of other cells than the currently serving cells and the selection of base stations as receiving stations for the uplink access requests from the selected user terminals. In these terminal and station selections different input parameters can be employed to form a dynamic selection or re-selection during the ongoing session to cope with changes in, for example, load, interference and terminal positions.

The invention also relates to a system for managing a multi-user session, an uplink access system and network nodes and user terminals comprising such systems.

SHORT DESCRIPTION OF THE DRAWINGS

The invention together with further objects and advantages thereof, may best be understood by making reference to the following description taken together with the accompanying drawings, in which:

FIG. 1 is a signal diagram illustrating the uplink access problems of prior art techniques;

FIG. 2A a diagram illustrating a first time distribution of user uplink access requests;

FIG. 2B a diagram illustrating a second time distribution of user access uplink requests;

FIG. 2C a diagram illustrating a third time distribution of user uplink access requests;

FIG. 3 is a diagram illustrating probability of user uplink access requests with the different time distributions of FIGS. 2A to 2C;

FIG. 4 a flow diagram illustrating a communication session managing method according to the present invention;

DETAILED DESCRIPTION

Figure 1:
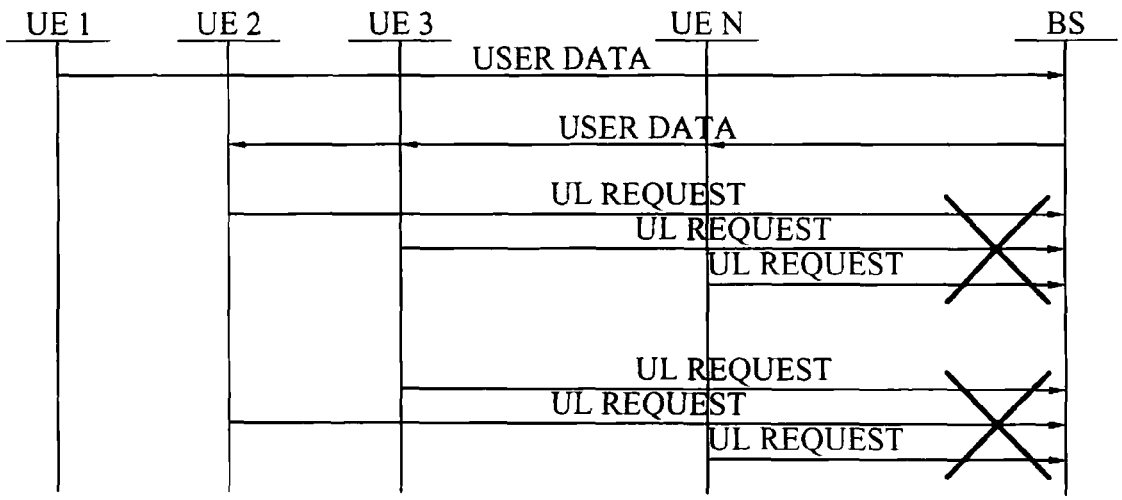

Throughout the drawings, the same reference characters will be used for corresponding or similar elements.

The present invention generally relates to management of a communication session, and in particular to uplink access management in such a session. The invention is directed to a communications service conducted in a session involving multiple participating session members that are present in a limited geographical radio-coverage area of a radio-based communication system or network. Thus, such a session involves multiple participating user terminals or mobile stations present in the radio-coverage area and communicating with each other by means of the network nodes of the communication system.

According to the present invention, a "cell" of the communication system is a limited geographical area or portion of the coverage area of the system, in which a network node or base station provides communication services to user terminal present within the cell. For example, a cell could be a circular, semi-circular or elliptical area around a base station being able to communicate with user terminal present within this area. The term "cell" as used herein also covers non-circular areas such as a sector or portion of a circular area around a base station. In such a case, the base station is typically equipped with multiple antenna arrangements (transmitters/receivers or transceivers) that provide radio-coverage within different sectors (cells) around the single base station.

The communication service of the present invention involves multiple user terminals that are members of and participate in a single communication session. The base stations of the communication system are employed as intermediate forwarding nodes for transmitting data originating from one terminal to the other user terminal participating in the session. In addition, user terminals present in a cell and participating in the session are connected and listening to a common downlink channel that carries the user data originating from another terminal member. As is well known in the art, downlink channel means that data is transmitted from a base station to user terminals.

The user terminals present in a given cell are connected to the base station serving that cell through the common downlink channel. This means that the data transmitted by the base station on that channel will, ideally, reach all user terminals present in that cell and participating in the session.

Examples of such a common downlink channel include a broadcast channel and a multicast channel.

Examples of communication services that allow multiple participating user terminals to communicate with each other include Internet Protocol (IP) based services using the IP Multimedia Subsystem (IMS) [3]. Such services can be used as a complement for or instead of traditional analogue Public Mobile Radio (PMR) and Public Safety Radio (PSR). A typical example would be Push to talk Over Cellular (PoC or PTT) or Instant talk using broadcast or multicast downlink channels to support large communication groups.

Today PoC is using unicast channels for forwarding user data from a transmitting user terminal to a base station (one uplink channel) and from the base station to the listening user terminals (one downlink channel per listening user terminal). This solution works fairly well if the participating user terminals are distributed throughout the whole communication system and/or only few terminals are simultaneously involved in the session. However, it is anticipated that PoC will be a preferred alternative for the analogue PMR and PSR services and other communication services, in which many participating user terminals are involved in the session and present in a substantially same portion of the communication session. In such a case, a unicast-based solution as used in the prior art is not a realistic alternative as the communication resources required for setting up the many parallel downlink channels will quickly run out. As a consequence, PoC using unicast-transmission cannot support the high number of user terminals that might be present for the future use of PoC as an efficient communication service. PoC using Multimedia Broadcast Multicast Service (MBMS) [5] is therefore a promising alternative to provide multicast or broadcast downlink transmission of data instead of multiple separate unicast downlink transmissions.

In order to facilitate the understanding of the present invention, a short discussion of the problems of the prior art techniques, such as PoC using MBMS, first follows.

FIG. 1 is a signal diagram illustrating the problems with implementing PoC and other multi-member communication services in radio-based cellular communication systems. In the figure, N user terminals (UE) or mobile stations are involved in the PoC session and present in the cell (radio-coverage area) served by a base station (BS). A user of a first of these terminals (UE 1) would like to communicate with the other participants. The PoC application of his/her terminal compiles and transmits (PoC) user data to the base station. The base station subsequently forwards this user data to the other participants' terminals by means of a multicast or broadcast transmission on a common downlink channel.

Once these other participants have received the data and their respective PoC application has played back the media, they might want to respond by transmitting a message of their own. However, before they can transmit any data they must first be assigned a respective uplink unicast channel to the base station. This is realized by first transmitting an uplink access request message to the base station using a dedicated request channel, denoted Random Access Channel (RACH) in the art. The standard [6] specifies how such a procedure should be performed. Basically, the user terminals shall send uplink access request messages on the RACH channel with a random delay between 0 and 20 ms. However, even though there is randomness in the generation of the access requests, the collision probability, i.e. the blocking on the RACH channel, is considerable as there are several listening user terminals that would like to respond to a previously received message almost simultaneously or at least within a short time window. As a consequence, only some or even none of these requests might be successfully received at the base station as illustrated in FIG. 1. In such a case, the standard [6] specifies that the uplink access requesting shall be repeated after a further period of 100 ms plus a random delay of 0 to 20 ms.

This means that the different user terminals will repeatedly try to transmit uplink access requests to the base stations on the RACH. A large number of requests will therefore almost simultaneously be transmitted to the base station, which increases the interference and collision probability of the RACH. The net result will be reduced quality of service for the users as they will be denied uplink access and therefore will not be able to respond to the calls of other users in the PoC session.

Figure 2A:
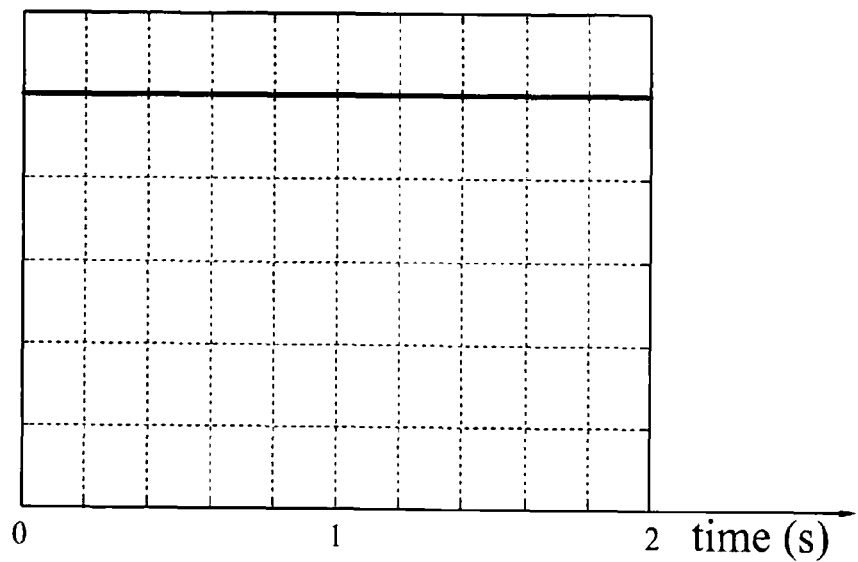
Figure 2B:
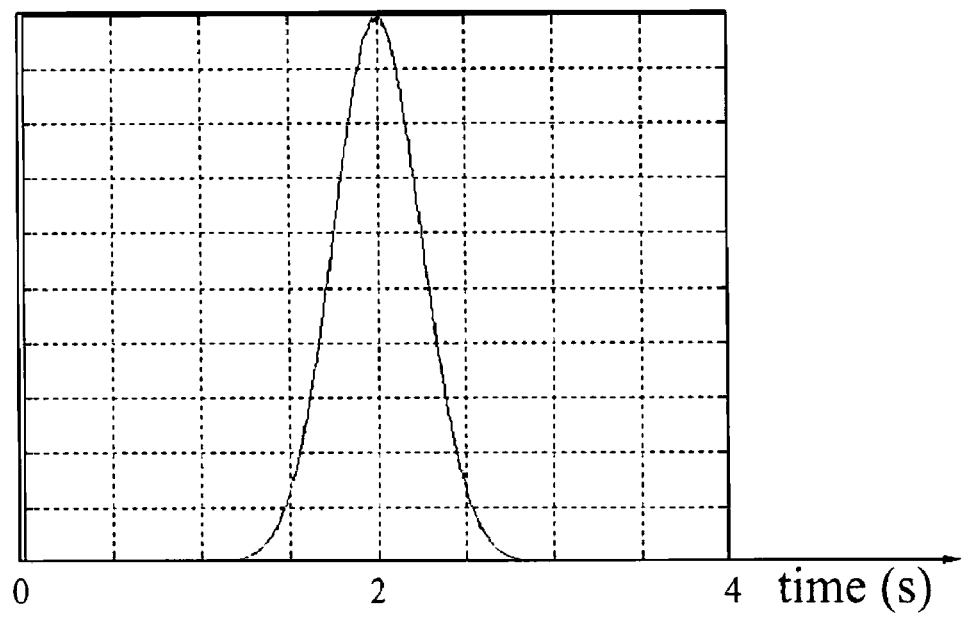
Figure 2C:
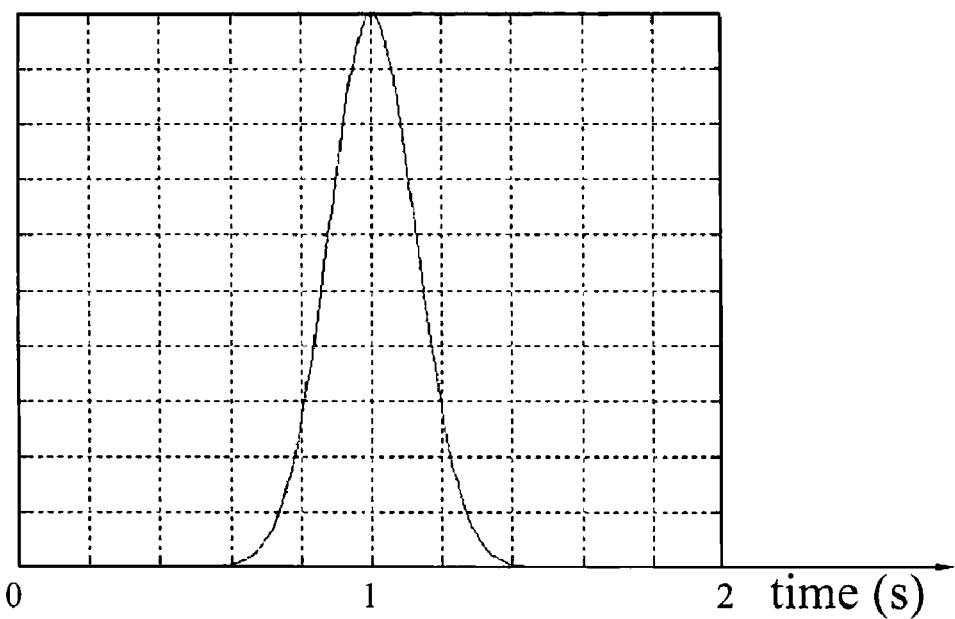

FIGS. 2A to 2C are diagrams illustrating possible distributions of floor requests, i.e. uplink access requests, following a previous call at time 0 s. In FIG. 2A a uniform distribution has been illustrated. In this figure the different uplink requests from participating user terminals are uniformly distributed during the first two seconds following a call from another user terminal. This distribution is highly unlikely and is mainly provided as a reference distribution.

FIG. 2B illustrates a normal or Gaussian distribution of the uplink requests centered around 2 s following the previous call and with a variability of 0.25 (mean $\mu=2$ s and standard deviation $\sigma^2=0.25$ s). FIG. 2C is another Gaussian distribution with mean $\mu=1$ s and standard deviation $\sigma^2=0.125$ s. These two distributions are more realistic distributions since if one would like to respond to a previous call, most users would make such a respond following 1 to 2 seconds after the previous call. A Gaussian distribution is therefore regarded as a good approximation of a typical real-life implementation.

Figure 3:
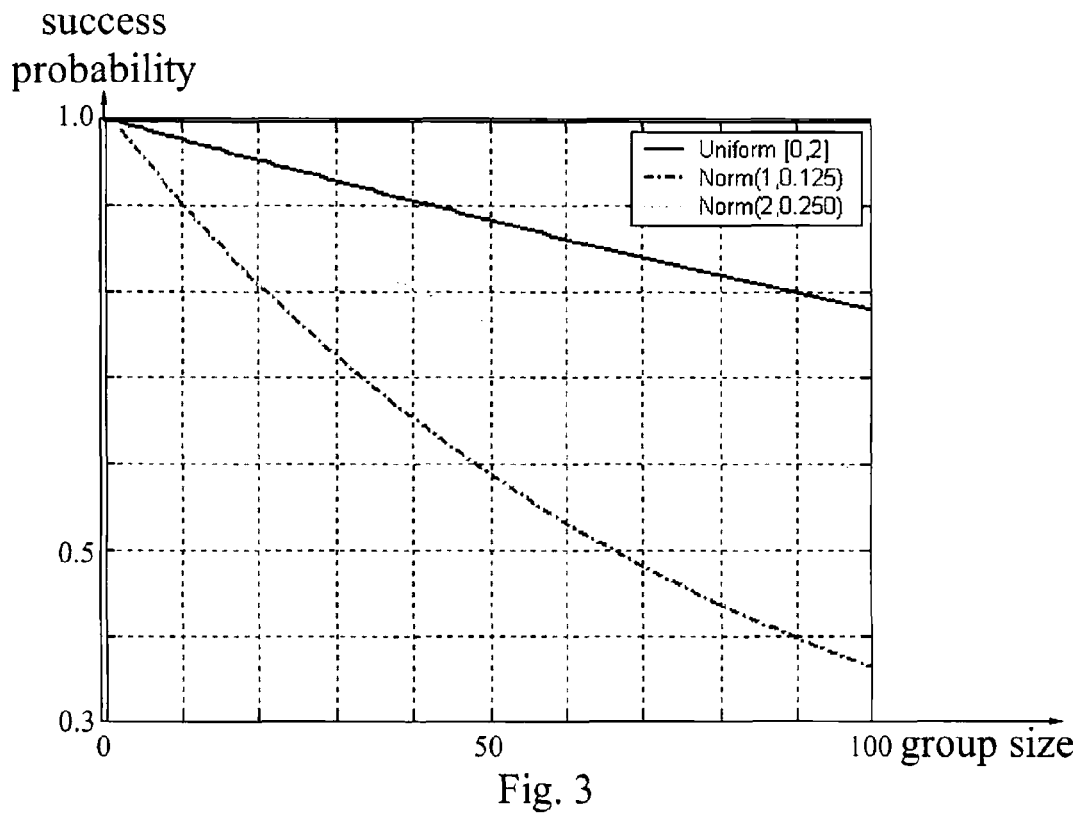

FIG. 3 is a diagram illustrating the results of simulated RACH requests at different group sizes with the reference distribution (FIG. 2A) and the two realistic distributions (FIGS. 2B and 2C) described above. The y-axis specifies the probability of successful uplink access, where the x-axis corresponds to the number of participants of the session present in a same cell. As can be seen in the figure, the blocking probability with a small group of 10 active responding users is as high as 10% for the normal distributed access request with mean 1 second. If the group size increases to, for example, 40 participants, the corresponding blocking probability is 35%, which is totally unacceptable.

The discussion above, thus, illustrates the problem of implementing PoC and other multi-user communication services in existing cellular communication sessions in terms collision and blocking.

The present invention provides a solution to this problem and thereby increases the quality of service to the different users and allows implementation of PoC and other IMS services using broadcast/multicast transmissions and uplink requests. Basically, the present invention involves, requesting at least one user terminal, to transmit its uplink request message using a request channel or RACH of another, typically adjacent or neighbor, cell. As a result, even though multiple user terminal are involved in a communication session and present within a same cell, not all of these user terminals transmit their uplink requests to the base station serving this cell but instead employs the RACHs of other cells. This will therefore distribute the uplink access requests over a larger portion of the communication system so that other cells will share some of the load of the relevant cell. Note though that these user terminals are not handed over to the adjacent or neighbor cell as they will keep the common downlink channel to the base station serving the cell in which they are present.

The teachings of the present invention can, independently, be applied to user terminals participating in the same or different communication session and present in different cells of the system. However, in the following the invention is described with reference to the actions and operations applied to and involving multiple user terminals present in a same cell and involved in the same session. The teachings can though be applied in parallel mutatis mutandis to other groups of user terminals present in other cells of the communication system.

Furthermore, it is assumed that each cell is assigned one or more request channels (RACHs) that can be used by user terminals for transmitting uplink access requests to the base station serving the cell. In the following, "first cell" denotes the radio-coverage area in which the multiple user terminals are present. The user terminals in the first cell have a common downlink channel with the base station serving this first cell. A "second cell" denotes another radio-coverage area of the communication system served by another base station or transmitter/receiver arrangement as compared to the first cell. In a typical implementation, the second cell is a neighboring or adjacent cell that completely or at least partly overlaps with the area of the first cell.

Figures 4, 5:
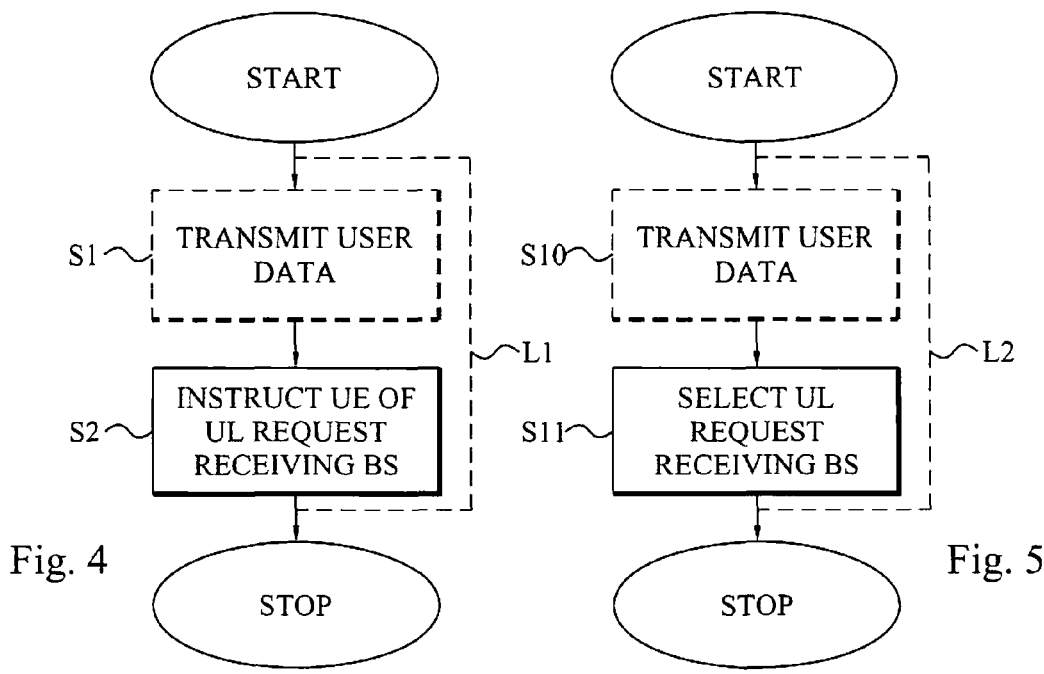
FIG. 5 is a flow diagram illustrating an uplink access method according to the present invention.

FIG. 4 is a flow diagram illustrating a method of managing a communication session according to the present invention. This session involves multiple, i.e. at least two, user terminals present in a first cell or radio-coverage area that is served by a first base station of a cellular communication system. The user terminals are further connected to the first base station through a common downlink channel employed for carrying user data from the base station to the receiving user terminals. This user data in turn originates from another member of the communication session that could be present in the first cell or in some other cell of the system. This so-called transmitting terminal could be a mobile user terminal or fixed equipments, such as a dispatcher employed for transmitting data to the participating user terminal. It is also anticipated by the invention that the session may involve other user terminals present in other cells of the system. However, in such a case these other user terminal are connected to their respective base stations with a downlink channel that is common for all terminals present within the respective cells served by the base stations and involved in the session. The teachings of the present invention can therefore be applied to all such groups of user terminals present in respective cells.

The method starts in the optional step S1, where the first base station transmits user data to the multiple user terminals using the common downlink channel. Following this reception of user data it is expected that at least some of the user terminal might want to respond and therefore transmit an uplink access request message. Therefore, in a next step S2, at least one of the user terminals is instructed to transmit any uplink access request message to a base station serving a second different cell. Thus, if this at least one user terminal would like to respond to the previous call, represented by the data reception following step S1, the user terminal should employ the request channel of this second cell instead of the request channel of the first cell. Note though that the instructed user terminal may actually select not to transmit any uplink access request at all if its user does not want to respond to the previously received data. However, if such a respond is taking place it is preceded by an uplink access request destined to the base station serving the other (second) cell.

The procedure performed in this step S2 is preferably performed each time multiple user terminals would like to access a respective uplink channel to thereby reduce the blocking probability and increases the chances of successful transmission of the request messages. For example, once one of the previously receiving user terminals has been granted uplink request following a successful reception of its request message, this user terminal transmits user data on the assigned uplink channel to the base station serving the first cell. This base station will in turn forward the data using the common downlink channel to the other user terminals of that cell and the procedure of steps S1 and S2 is repeated, as schematically illustrated by the line L1.

Alternatively, the user terminal instruction employed in step S2 is used throughout at least a portion of the session time. Thus, even though a new user data broadcasting or multicasting is tasking place, the previously instructed user terminal(s) continue(s) to use the request channel of other cells for any uplink access requests. However, the selection of user terminal(s) that are instructed and that should use the request channels of other cells can change during the session as is described further herein. In such a case a new terminal instructing step S2 is preferably conducted. The method then ends.

FIG. 5 is a corresponding flow diagram of an uplink access method according to the present invention. This access method is applicable to a communication session involving multiple participating user terminals presenting in a first cell served by a first base station. These user terminals all share a common downlink channel to the first base station that is used for carrying user data originating from a terminal being a member of the session. The method starts in the optional step S10 which involves the transmission of user data on the common downlink from the base station and to the user terminals. This step S10 basically corresponds to step S1 of FIG. 4 and is not described further herein.

In a next step S11, a base station serving a second different cell is selected for at least one user terminal as receiving base station for an uplink request message originating from this at least one terminal. This means that the request channel of another (adjacent or neighbor) cell will be employed by the at least one user terminal when or if it transmits any uplink access request message. The uplink request will then be received by the transceiver or receiver of that base station instead of the receiver/transceiver associated with the transmitter/receiver employed for the common downlink channel.

This selecting step S11 is preferably repeated each time new user data has been forwarded to the user terminals, which is schematically illustrated by the line L2 in the figure. A dynamic selection throughout the session is also possible, which is described further herein. The method then ends.

The instructing step of FIG. 4 and the selecting step of FIG. 5 do not necessarily have to be conducted in connection with forwarding downlink data to the user terminals. In clear contrast, the steps could, in an embodiment, be performed during or directly following the session set-up procedure. In this embodiment, at least one user terminal has selected or has been assigned a base station serving another cell as receiving base station for its possible uplink access requests before any user data has been communicated in the session. In another embodiment, the instructing or selecting step is performed in connection with the forwarding of user data on the common downlink channel. A further possibility is that the instruction or selection is performed once a user terminal has tried to send an uplink request message to the base station serving the first (current) cell but the message was not successfully received at the base station. This embodiment will reduce the blocking probability for any further uplink requests even though the first request was unsuccessful.

Figure 6:
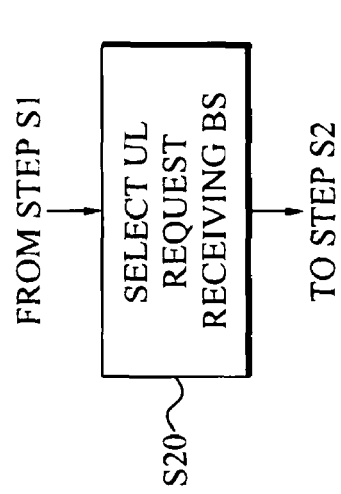
FIG. 6 is a flow diagram illustrating an additional step of the method of FIG. 4.

FIG. 6 is a flow diagram illustrating an additional step of the session managing method of FIG. 4. The method continues from step S1 of FIG. 4. In a next step S20, the receiving base station to which the user terminal should send its uplink request is selected. This base station serves a second cell different from the first cell of the user terminal. If multiple user terminals should not employ the request channel of the current first cell, all these terminals could use the request channel of a same neighboring cell. In an alternative approach, at least two different cells and their associated base stations are selected in step S20 to use for the different terminals. In such a case, a first portion of the terminals in the first cell would use the request channel(s) of the base station serving a second cell, a second portion of the terminals use the request channel(s) of the base station serving a third cell, while a third and remaining portion of the terminal would use the request channel(s) of the first base station serving the first cell. This approach can of course be extended to the usage of more than two neighboring cells. In addition, the actual request channels of the selected channel could also be specified in the step S20 if there is a choice of multiple such request channels for a given selected cell. The method then continues to step S2 of FIG. 4, where the at least one user terminal is informed of this selected base station/cell/request channel.

The base station serving the second cell could be a second base station of the communication system and the base station serving the first cell is then a first base station. The first and second base station could be two neighboring base stations, where their respective radio-coverage areas (first and second cells) at least partly overlap. For example, the first base station could serve a so-called micro or pico cell, whereas the second base station could serve a so-called macro cell. The micro/pico cell can completely or at least partly be positioned within the area of the macro cell. As is known in the art, the size of the macro cell is comparatively larger than the size of the micro/pico cell. Alternatively, the first and second cell could be two partly, fairly equally sized, neighbor cells that partly overlap at the cell borders.

In another embodiment, the base station serving the first cell and the base station serving the second cell are the same base station. The base station then has at least two transmitter arrangements providing radio-coverage in two separate, but possibly partly overlapping, cells or sectors. However, also in this case, each cell has a dedicated uplink request channel to use for its serving user terminal even though the requests transmitted on these channels will reach the same physical base station.

In a preferred embodiment, the selecting step of FIG. 5 or 6 involves selecting a receiving base station from multiple available base stations serving different cells in the cellular communication system. In the following different parameters and quantities to use in selecting a particular receiving base station from the multiple stations will be described. The present invention encompasses usage of any of these parameters or any combination of at least two parameters in the base station selection.

In an embodiment, estimates of a respective radio link quality for the communication links between a user terminal and its available candidate base stations can be used. As is known in the art, a user terminal and/or base station generally periodically or intermittently performs measurements representative of the radio quality link between the user terminal and base stations from which the user terminal can receive data. Such link quality measurements and estimations are traditionally employed for selecting a currently serving base station and cell and for deciding whether to perform any handover procedure for the user terminal. Thus, the user terminals and the network already comprise functionality for performing such measurements and generate the quality estimates.

The estimates are then used as basis for the base station selection. This allows selecting a currently non-serving base station as receiving base station for a possible uplink request message based on a quality measure. As a consequence, it is possible to identify a receiving base station having a high probability of successfully receiving the uplink access request by selecting a base station to which the user terminal has a high radio link quality. This means that base stations to which the user terminal has a comparatively much lower link quality could be disregarded as the chances of successfully transmitting any access request to these base stations are slim due to the poor link quality.

The available or candidate receiving base stations of a user terminal are preferably those base stations having an associated identifier included in the monitored set of the user terminal. As is well known in the art, the monitored set comprises those base stations included in the cell info list. These base stations are detected by the user terminal and the terminal performs measurements on data transmitted therefrom. The base stations should be distinguished from the base station(s) of the active set, which are base stations to which the user terminal is simultaneously connected to. In this embodiment, information of the base stations present in the monitored set is therefore employed in the selection of candidate receiving base station for any uplink access requests. These monitored base stations are good candidates as the user terminal is able to at least receive data therefrom and the chances of successfully transmitting data thereto is higher as compared to a totally random base station selection.

The monitored list can, in addition to the identifiers of the monitored base station, also include or be associated with load information. This information then represents the current traffic situation and communication load in the different neighboring cells. This load information can advantageously be used in the base station selection of the invention. In such a case, a base station having a high load situation should not be selected due to high blocking risks and low probability of successfully receiving an uplink request from the user terminal.

Information of the topology of the communication system or at least the portion of the system around the current serving base station could be useful in the base station selection. From such a topology information, potential receiving neighbor base stations to which the user terminal should be able to transmit uplink requests from a radio-distance point of view can be identified. Therefore this topology information can be used according to the invention when selecting receiving base station. This topology information can be complemented with position information of the actual user terminal, such as determined from a Global Positioning System (GPS), triangulation technique or some other positioning procedure.

Figure 7:
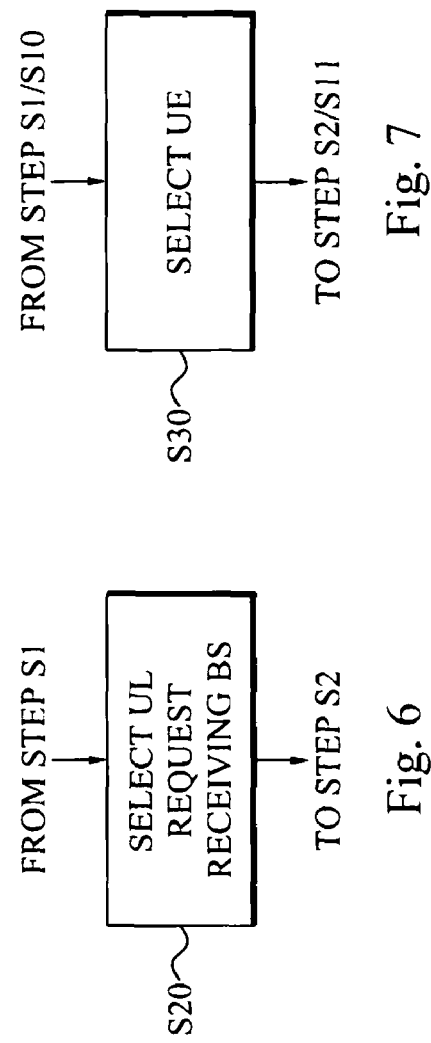
FIG. 7 is a flow diagram illustrating an additional step of the method of FIG. 4 or FIG. 5.

FIG. 7 is a flow diagram illustrating an additional step of the method of FIG. 4 or 5. The method continues from step S1 of FIG. 4 or step S10 of FIG. 5. In a next step S30 a user terminal is selected from multiple user terminals present in the first cell and participating in the communication session. This step S30 could select a single user terminal, a sub-portion of the user terminals or actually all user terminals participating in the session and present in the current cell. The method then continues to step S2 of FIG. 4, where the selected user terminal(s) is (are) instructed to transmit any uplink access requests to the base station of another cell in the system, or to step S11 of FIG. 5, where a base station serving another cell in the system is selected as receiving base station for any uplink access requests.

In the case multiple user terminals are selected in step S30 of FIG. 7, all of these user terminals could send their uplink requests to a same base station serving a cell different from the current cell. However, in a preferred implementation, especially if a substantial number of user terminal are selected, a portion of these user terminals could employ a base station of a second cell for transmitting access requests whereas another portion of the terminals could employ a base station of a third cell and so forth.

In correspondence to the selection of candidate base station described in the foregoing, different parameters can be used for selecting the number of user terminals which should send their uplink requests to other base stations than the currently serving station and the identity of these user terminals. The present invention therefore encompasses usage any of the parameters described herein and any combination of two or more parameters in the user terminal selection.

In an embodiment, the number of user terminals involved in the communication session is used as a parameter for determining the number of user terminals which should send any uplink access requests using request channels associated with other neighboring cells. This number can be received from a service node, such as IMS or PoC node that contains information of the user terminals being members to different IMS or PoC session groups. Alternatively, the MBMS context can include information of the number of user terminals involved in the session. This context is often available in a General Packet Radio Services (GPRS) support node, such as the Serving GPRS Support Node (SGSN) or Gateway GPRS Support Node (GGSN). In a preferred embodiment, the number of user terminals involved in the communication session and present within a same cell is employed as selection parameter for that cell. Generally, the more user terminals involved in the session and present the same cell, the higher the risk for blocking and interference on the request channel of that cell. As a consequence, a portion of the user terminals should therefore send any uplink requests using the request channels of other cells. Furthermore, in a first situation M user terminals are involved in the session in a given cell, whereas in a second situation only N user terminals are participating, where M>N. In the first case, m user terminals are selected for transmission of uplink access requests using request channels of other cells, whereas in the second case n user terminals are selected. In a preferred implementation, this number n is smaller than m as N is smaller than M. Thus, the number of participating user terminals and in particular the number of participating user terminals present in a same cell is a preferred selection parameter according to the invention.

In another embodiment, the selection of number of user terminals in step S30 of FIG. 7 is performed at least partly based on an estimate of a number of uplink request messages expected to be transmitted in the cell within a defined time period or window. Generally, if several such request messages are expected within the time period more user terminals should be selected as compared to a situation with a correspondingly lower expected number of access requests. This estimate can be obtained from statistics of the usage of the particular (PoC) communication service. Thus, the service provider/server can collect information of previous usage of the communication service from different parts of the communication system. This information is then processed to obtain usage trends and utilization data. Examples of such data is the average number of uplink requests that generally follows within a time period of, for example one or a few seconds, following previously transmitted common downlink user data. The processing of service information can be more or less detailed and individualized. For example, the estimate can be determined as an average value for previous PoC sessions without any discrimination of the different session groups. In such a case, the estimate can be used in connection with all subsequent PoC sessions as selection parameter. In a more differentiated approach, the PoC server could collect previous session information and statistics separately for different session groups. The reason for this is that the usage pattern can differ quite substantially between different user groups and a common average value might not be a most suitable estimate parameter. In clear contrast, different such estimates are then determined and preferably continuously updated over time.

In an even more differentiated approach, the communication server keeps statistics of individual user terminals. Thus, the average number of user terminals transmitting uplink access requests or the average number of such transmitted requests following downlink transmission of user data originating from a given user terminal are determined and kept at the server. The reason for this is that there can be vast differences in the number of responding user terminals based on the identity of the previously transmitting user terminal. For example, if the user data originates from a fire officer of a fire brigade, generally many of the firemen will respond as compared to the situation where the user data originates from one of the firemen, in which case only the fire officer typically responds.

In a further approach of the invention, the selection of user terminals and uplink access method of the invention is not performed before the first transmission of uplink access requests. In clear contrast, the user terminals involved in the session are allowed to try to successfully transmit their uplink access requests using the requests channels of the cell(s) in which they are present. The arising interference level, such as signal-to-noise ratio or signal-to-interference ratio, caused by the transmission of the multiple uplink access requests is estimated and used as selection parameter. Generally, the higher interference the more user terminals should use the request channels of other cells for transmission of uplink access requests. The interference estimate can be determined by the user terminals or the base stations based on measurements performed by the user terminals and/or the base stations using techniques well-known in the art. This means that at least some of the subsequent uplink request messages will be sent using the request channel(s) of neighboring cell(s).

The users participating in the communication session might have been assigned different user prioritizations e.g. defined by the service subscription. Such prioritizations are preferably used in the user terminal selection. Generally, given no blocking or interference, the chance of successful transmission of an uplink request message is typically higher using the request channel of the current cell as compared to the request channel of a neighboring cell. As a consequence, the selection of user terminals that should use the neighboring cells' request channel is preferably performed among low prioritized user terminals as determined from the assigned user prioritizations. This leaves the current cell's request channel for the high prioritized user terminals.

Figure 8:
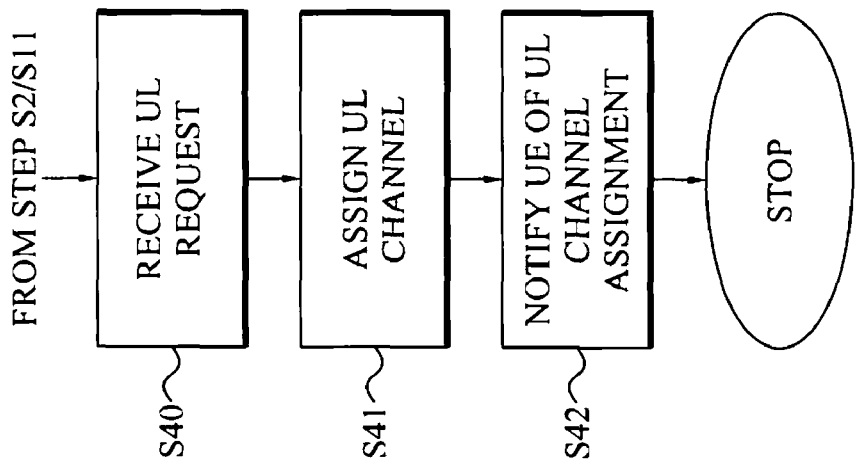
FIG. 8 is a flow diagram illustrating additional steps of the method of FIG. 4 or FIG. 5.

FIG. 8 is a flow diagram illustrating additional steps of the method of FIG. 4 or 5. The method continues from step S2 of FIG. 4 or step S11 of FIG. 5. In a next step S40, the user terminal (selected in FIG. 7) transmits its uplink access request message to the candidate base station (selected in FIG. 6) using the request channel of the second cell served by the candidate base station. Thus, this base station receives the uplink request message from the user terminal. In a next step S41, an uplink channel is assigned to the requesting user terminal.

In first embodiment of this step S41, the assigned uplink channel is an uplink channel between the user terminal and the first base station serving the first cell in which the user terminal is present. Thus, the user terminal will then have both the common downlink channel and the temporarily assigned uplink channel to same base station (transmitter/receiver arrangement). In this embodiment, uplink request receiving base station typically forwards the uplink request to the base station serving the first cell. This base station is therefore informed of the user request even though it itself did not directly receive it from the user terminal. The base station then assigns one of its available uplink channels to the particular user terminal in step S41. Alternatively, the uplink request is forwarded from the receiving base station to a base station controller (BSC) or radio network controller (RNC) that performs the uplink assignment. This BSC will then inform the base station serving the first cell.

In an alternative approach, the uplink channel assigned to the user terminal allows transmission of user data from the terminal to the base station that received the uplink request message. In this case, the user terminal, thus, has a downlink (broadcast or multicast) channel to the base station serving the first cell and a temporary uplink (unicast) channel to the (receiving) base station serving the second cell. If the user terminal sends any user data on the assigned uplink channel, the receiving base station will typically forward the data up to higher level nodes to reach IMS (PoC) or application server node that then forwards the user data to the base station managing the common downlink channel, which is discussed further herein.

In either case, the user terminal is informed in step S42 of the uplink channel assignment. This notification can be transmitted by the base station serving the first cell or the base station serving the second cell. The user terminal is then free to use the assigned uplink channel for transmission of user data to the other members of the session.

In the following, different signal diagrams illustrating possible implementation embodiments of the invention will be described. In these diagrams, a one-to-one relationship between cell and base station is assumed. Thus, each base station serves a single cell. However, this should merely be seen as an illustrative example as a single base station could serve multiple cells. As a consequence, when these diagrams refer to base station BS 1, BS 2, BS 3 and so on, this could likewise correspond to cell 1, cell 2, cell 3, and so on.

Figure 9:
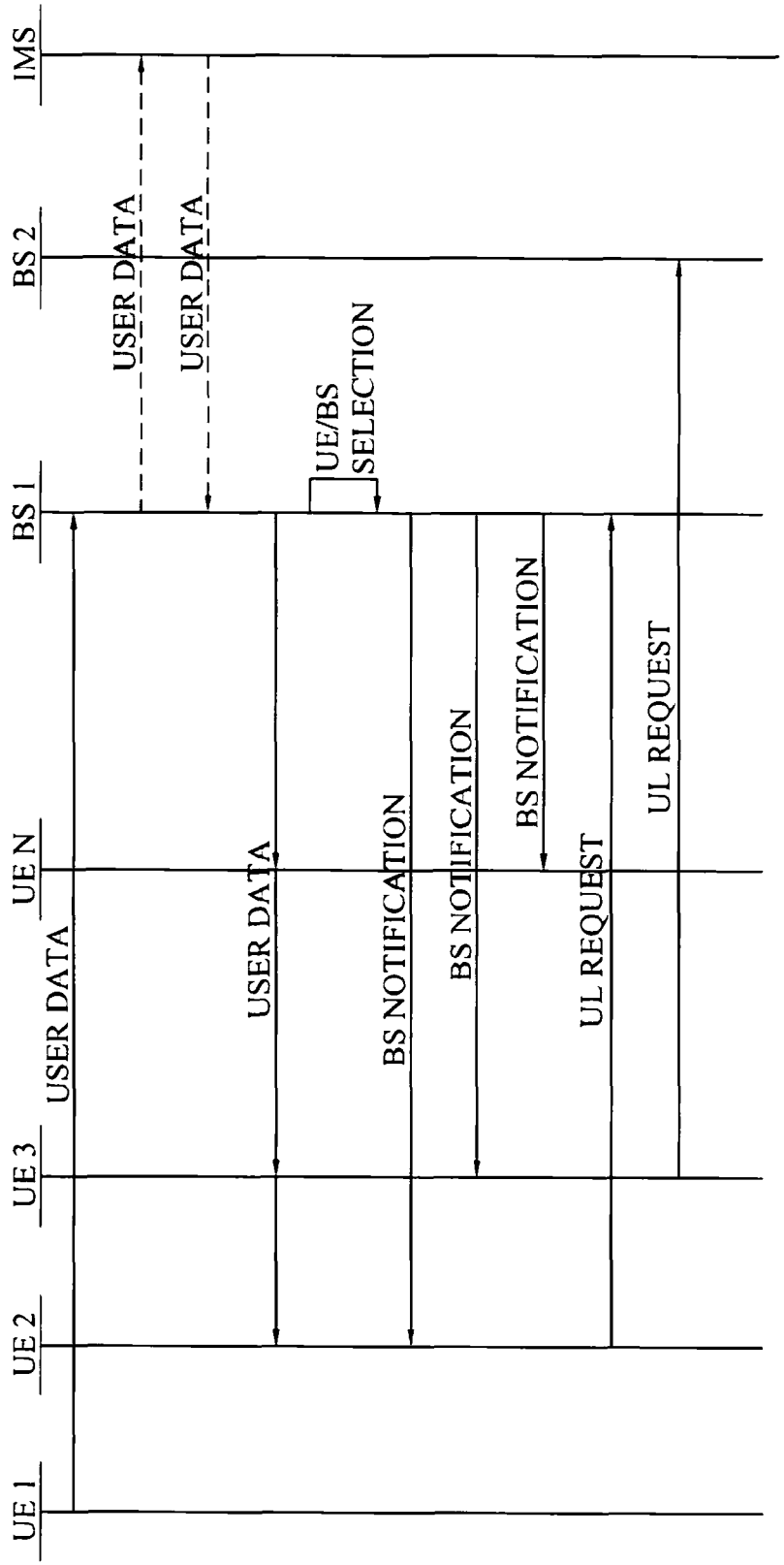
FIG. 9 is a signal diagram illustrating an embodiment of uplink access management according to the present invention.

FIG. 9 is a signal diagram illustrating an embodiment of uplink access management according to the present invention. In the figure, user terminals UE 2 to UE N are present in the first cell served by the base station BS 1 of that cell. The communication system also comprises a neighboring second cell served by the base station BS 2. The session involves transmission of user data from one of the user terminals UE 1 intended to the other terminals UE 2 to UE N of the session. This user data is, for example, transmitted using a previously assigned uplink channel to the base station BS 1. In a typical real implementation, the user data is forwarded up to core network nodes and to the service node, such as IMS or PoC node. The user data is then forwarded from this services node to the base station BS 1, that multicasts/broadcasts the user data on the common downlink channel to the other terminals UE 2 to UE N. If the IMS service functionality or at least a portion thereof is implemented in the base station BS 1, no forwarding of the user data to other higher level nodes is generally required.

The base station BS1 also selects, in connection with the user data forwarding, which user terminals listening to the common downlink that should use the request channel(s) of another cell or several other cells. In addition, this/these particular other cell(s) is determined. The base station BS1 could then inform each participant terminal US 2 to US N of which base station the terminal should communicate with in terms of uplink request transmissions.

In this illustrative example, user terminal UE 3 is assigned to use the request channel of a second cell served by the base station BS 2, whereas the other user terminals UE 2, UE N should use the request channel to the base station BS 1. The user terminals UE 2 and UE 3 want to respond to the previously broadcast/multicast data by transmitting data of their own. The terminals UE 2 and UE 3 therefore compile and transmit uplink access requests. The user terminal UE 2 sends its request to the base station BS 1, as known in the art, whereas the user terminal UE 3 sends its request to the base station BS 2, as taught by the invention. The distribution of uplink request transmissions among multiple cells will reduce the risk of request channel blockage and increase the chances of successful uplink access.

Figure 10:
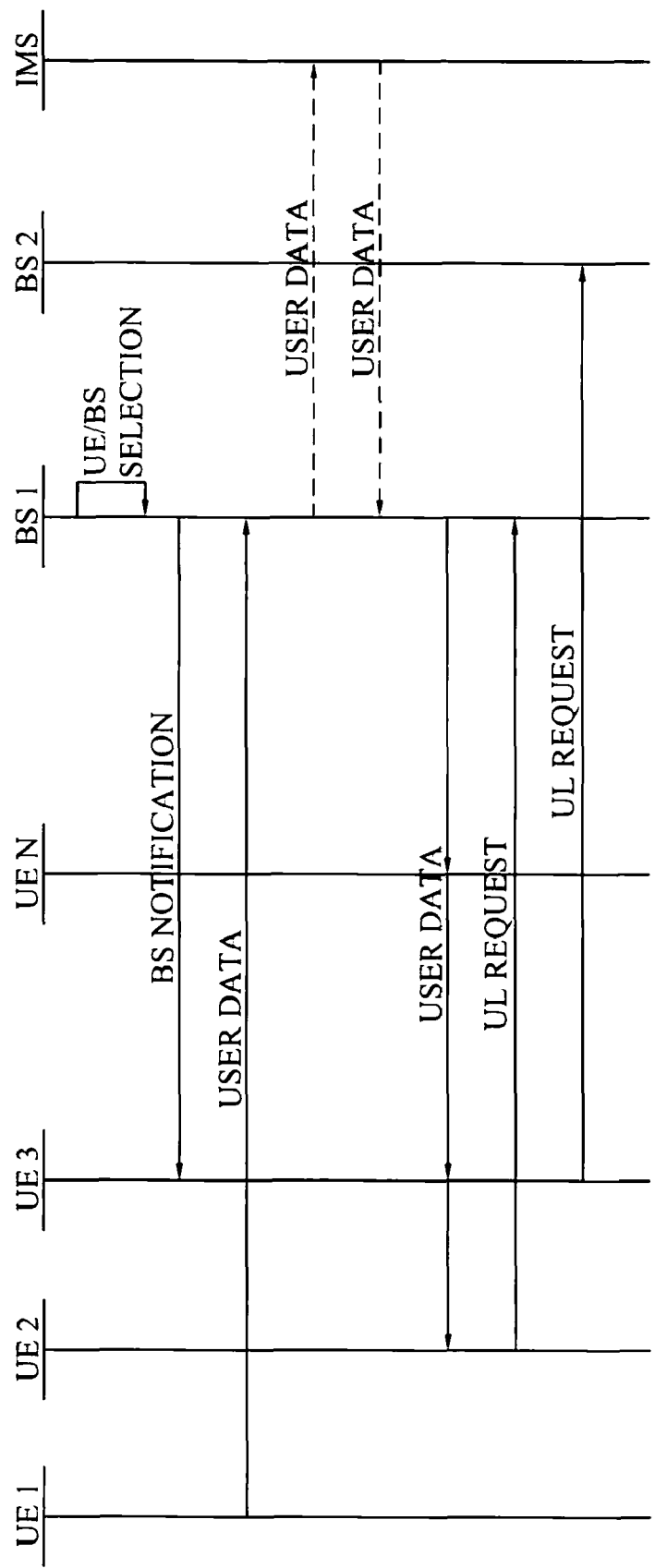
FIG. 10 is a signal diagram illustrating another embodiment of uplink access management according to the present invention.

FIG. 10 is a signal diagram illustrating another embodiment of uplink access management according to the present invention. In this embodiment, the selection of user terminal and receiving base station is performed independent of the data forwarding. Thus, the selection could be conducted in connection with the session set-up procedure or shortly thereafter. In this embodiment, user terminal UE 3 is selected for usage of BS 2 as receiving base station.

The figure illustrates another difference as compared to FIG. 9. In FIG. 10 only the user terminals) UE 3 that is (are) assigned to use a base station BS 2 other than the currently serving base station BS 1 as receiving base station are notified. The other user terminals UE 2, UE N will then employ the base station BS 1 as receiving station according to the prior art teachings.

In correspondence to FIG. 9, a user terminal UE 1 transmits user data to the base station BS 1, which forwards the data up to higher level nodes. The data is then returned to the BS 1, which forwards it on the common downlink channel to the other terminals UE 2 to UE N. In this example, UE 2 and UE 3 would like to respond and therefore request uplink access. The UE 2 transmits its request to the base station BS 1 since it has not received any notification of any other base station. UE 3 has, however, been informed to use a request channel of BS 2 instead of BS 1 for its access request and therefore transmits the request to BS 2.

Figure 11:
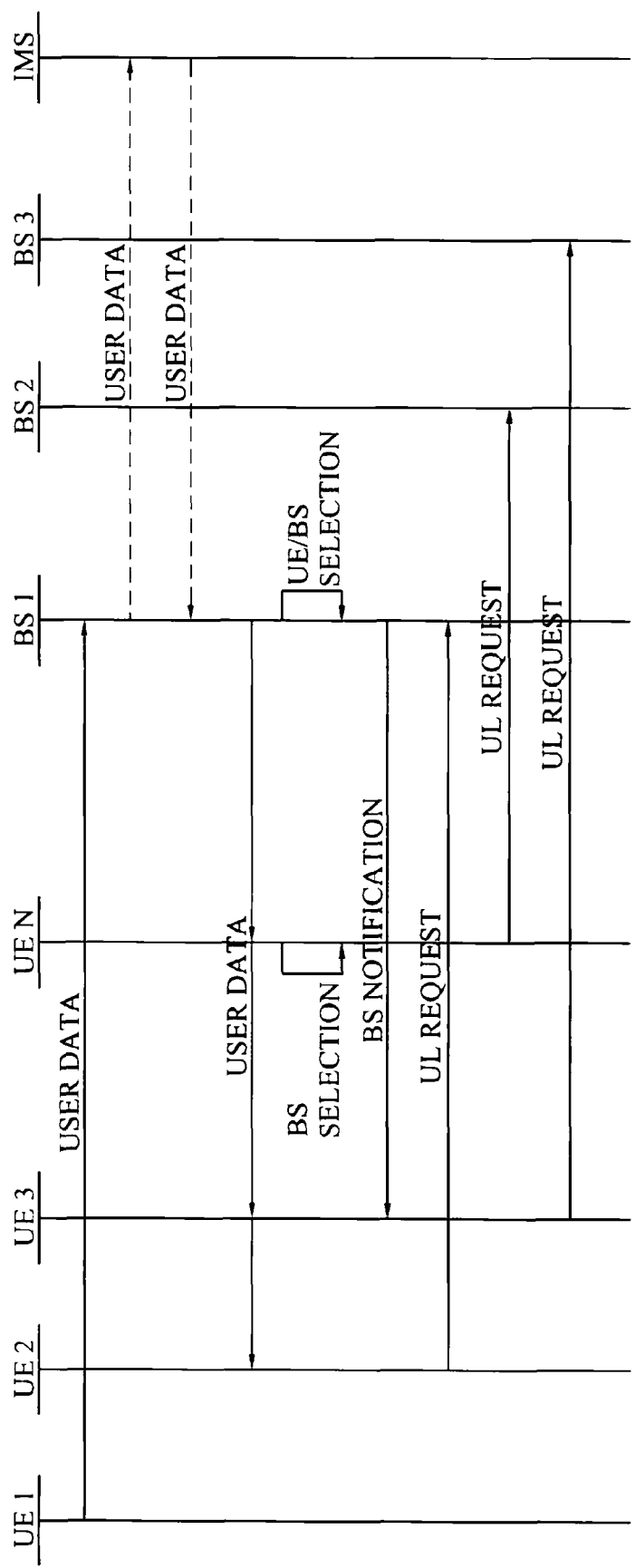
FIG. 11 is a signal diagram illustrating a further embodiment of uplink access management according to the present invention.

FIG. 11 is a signal diagram illustrating a further embodiment of uplink access management according to the present invention. In this embodiment, two alternative cells and base stations BS 2 and BS 3 are available for the access requesting. The embodiment also illustrates that the selection of receiving base station can be performed by a user terminal itself and not necessarily by a base station.

The signaling starts similar to FIG. 9 with user data uplink transmission and downlink forwarding. One of the user terminals UE N selects another base station BS 2 as its receiving base station. In addition, the serving base station (or actually any other network node) selects user terminal UE 3 to use the base station BS 3 for any uplink requests. This user terminal UE 3 is therefore informed of the selected receiving base station BS 3 in a notification from the base station BS 1.

It could be possible that all of the user terminals UE 2 to UE N would like to respond to the transmission from the terminal UE 1. The user terminal UE 2 has not itself selected any other receiving base station besides the default station BS 1 nor has it been assigned any other base station. As a consequence, it transmits its uplink request message using the request channel of the base station BS 1. The user terminal UE 3 has been assigned BS 3 as receiving station. The terminal UE 3 therefore transmits its access request by means of the request channel of that base station BS 3. The final user terminal UE N has itself selected BS 2 as receiving station and transmits its access request using the request channel of BS 2. In this example, the risk of collision is minimized as different base stations BS 1, BS 2, BS 3 are used as receiving stations for the different requesting user terminals UE 2 to UE N.

It is anticipated by the invention that the different embodiments of the uplink access management of FIGS. 9 to 11 can be combined to form further embodiments by combining different processings and communications of the figures.

The present invention not only reduces the risk of collision on the request channels and thereby provides faster uplink access, the invention also allows for a service or system controlled uplink channel access probability. The reason for this is that the system can affect the expected channel access probability by determining the actual distribution of uplink access requests over different cells. In addition, the present invention can also compensate for a (too) low number of request channels per cell as it is sometimes not economically or technically feasible to increase this number of channels in the different cells.

Figure 12:
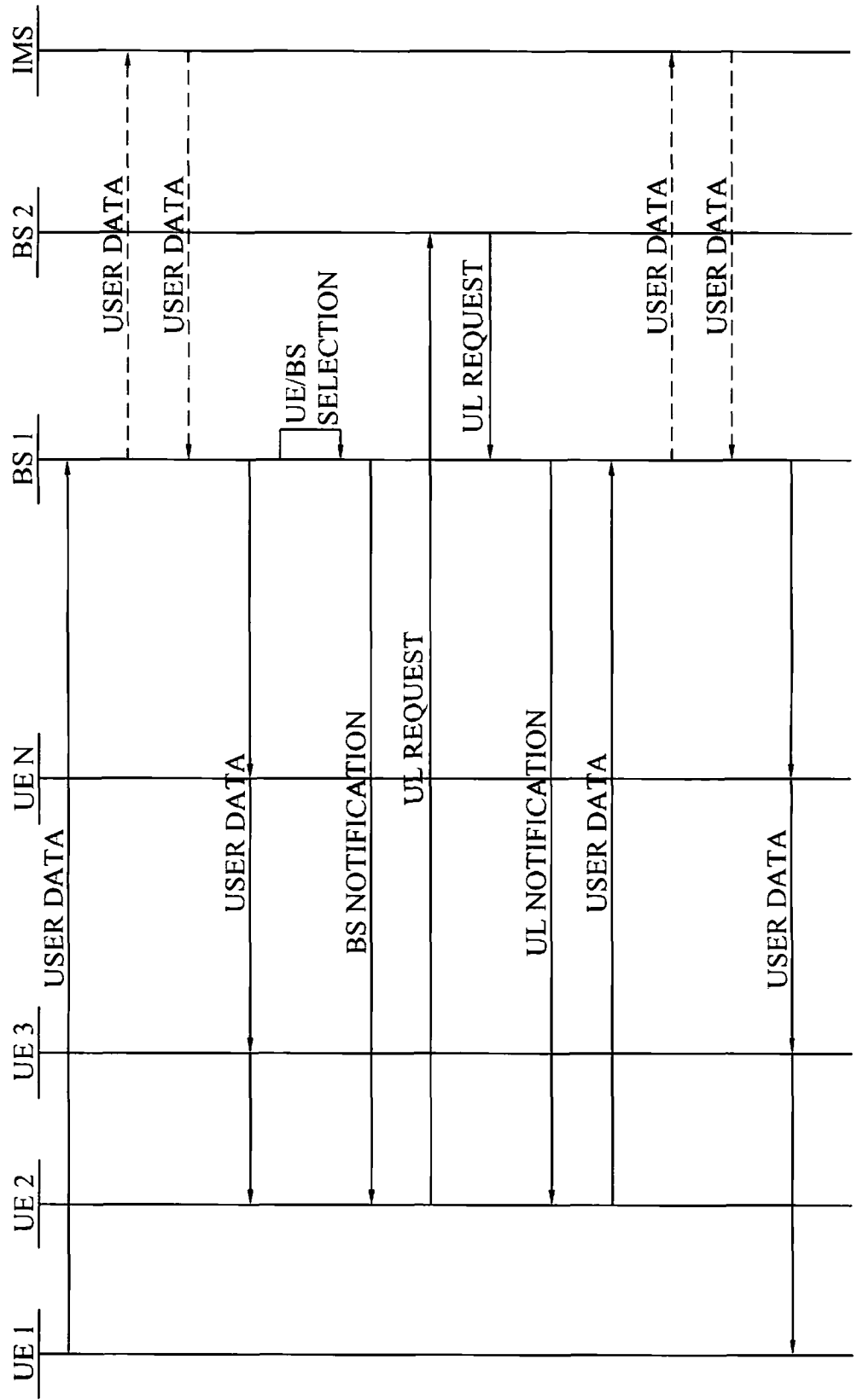
FIG. 12 is a signal diagram illustrating an embodiment of media session management according to the present invention.

FIG. 12 is a signal diagram illustrating an embodiment of media session management according to the present invention. This signaling starts similar to the uplink access management of FIG. 9 by UE 1 transmitting user data to BS 1 that forwards the data to the IMS node. Once the user data is returned to the base station BS 1, the base stations BS 1 multicasts or broadcasts the data to the other user terminals UE 2 to UE N of that cell. The base station BS 1 also selects and notifies the user terminal UE 2 to use the neighbor base station BS 2 for any uplink request messages.

In this example, the user terminal UE 2 would indeed like to respond to the transmissions of UE 1. The terminal UE 2 therefore compiles and transmits an uplink access request to the assigned base station BS 2. This base station BS 2 forwards the request to the serving base station BS 1 that assigns an uplink channel to the user terminal UE 2. The station BS 1 informs the terminal UE 2 of the assigned uplink channel. The user employs his/her terminal UE 2 to record voice data, which is processed in the terminal UE 2 and sent as data packets containing so-called user data by means of the assigned uplink channel. The receiving base station BS 1 receives the data and forwards it to the IMS node. After receiving the data from the IMS node, the base station BS 1 multicasts/broadcasts the user data on the common downlink channel to the other terminals UE 1, UE 3 to UE N.

Figure 13:
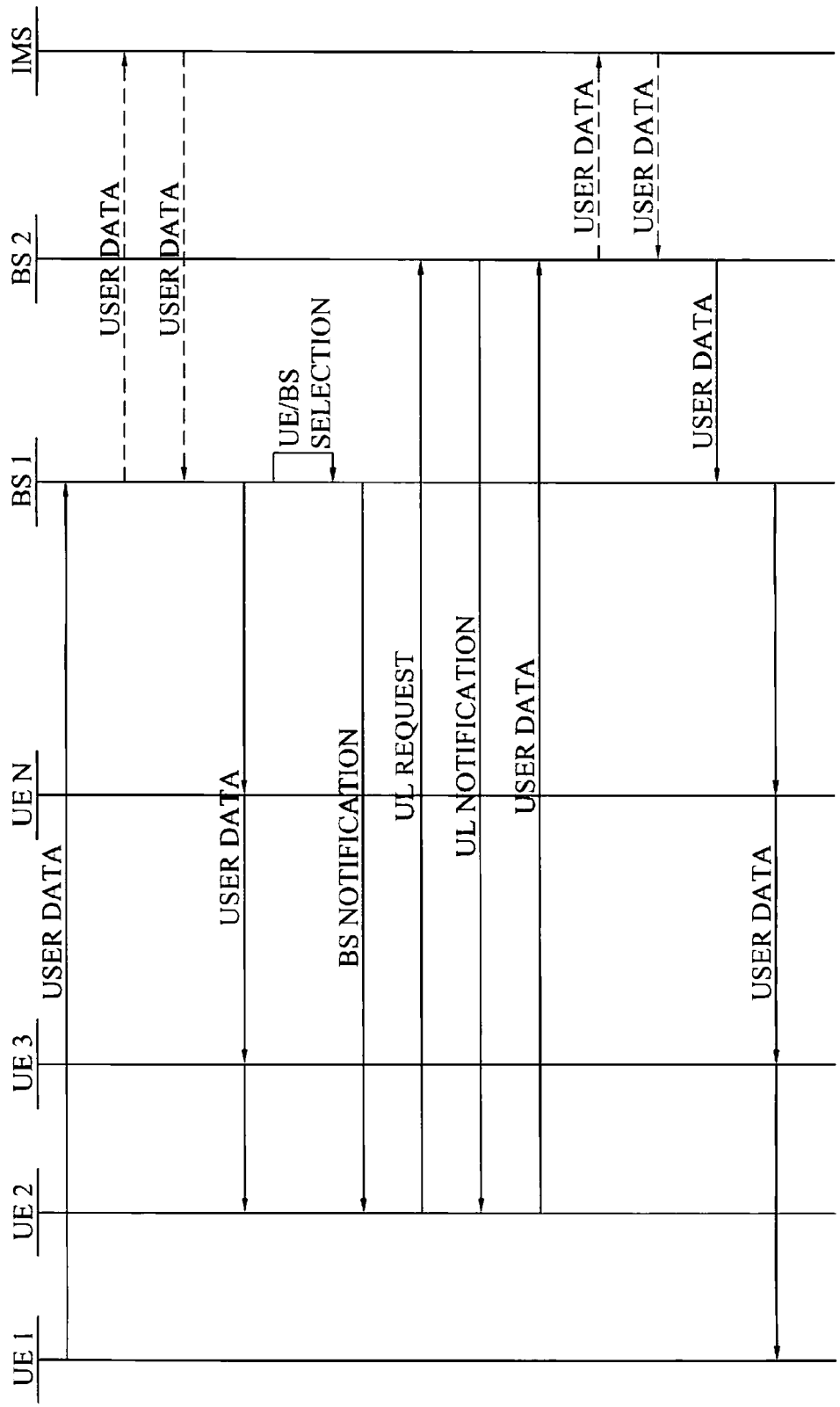
FIG. 13 is a signal diagram illustrating another embodiment of media session management according to the present invention.

FIG. 13 is a signal diagram illustrating another embodiment of media session management according to the present invention. This embodiment starts with the same signaling as in FIG. 12 until after the reception of the uplink access request on the notified request channel. In this embodiment, the base station BS 2 assigns an uplink channel for the user terminal UE 2. In addition, the uplink channel is to the base station BS 2 and not BS 1. The terminal UE 2 is notified of the uplink assignment. The compiled user data is therefore unicast using this assigned uplink channel to BS 2. As it receives the data, the base station BS 2 forwards it to the IMS service node. The user data is then transmitted through the core and radio access network to the serving base station BS 1. This base station BS 1 multicasts/broadcasts the data on the common downlink channel to the other terminals UE 1, UE 3 to UE N involved in the session and present in the cell 1 of BS 1.

Figure 14:
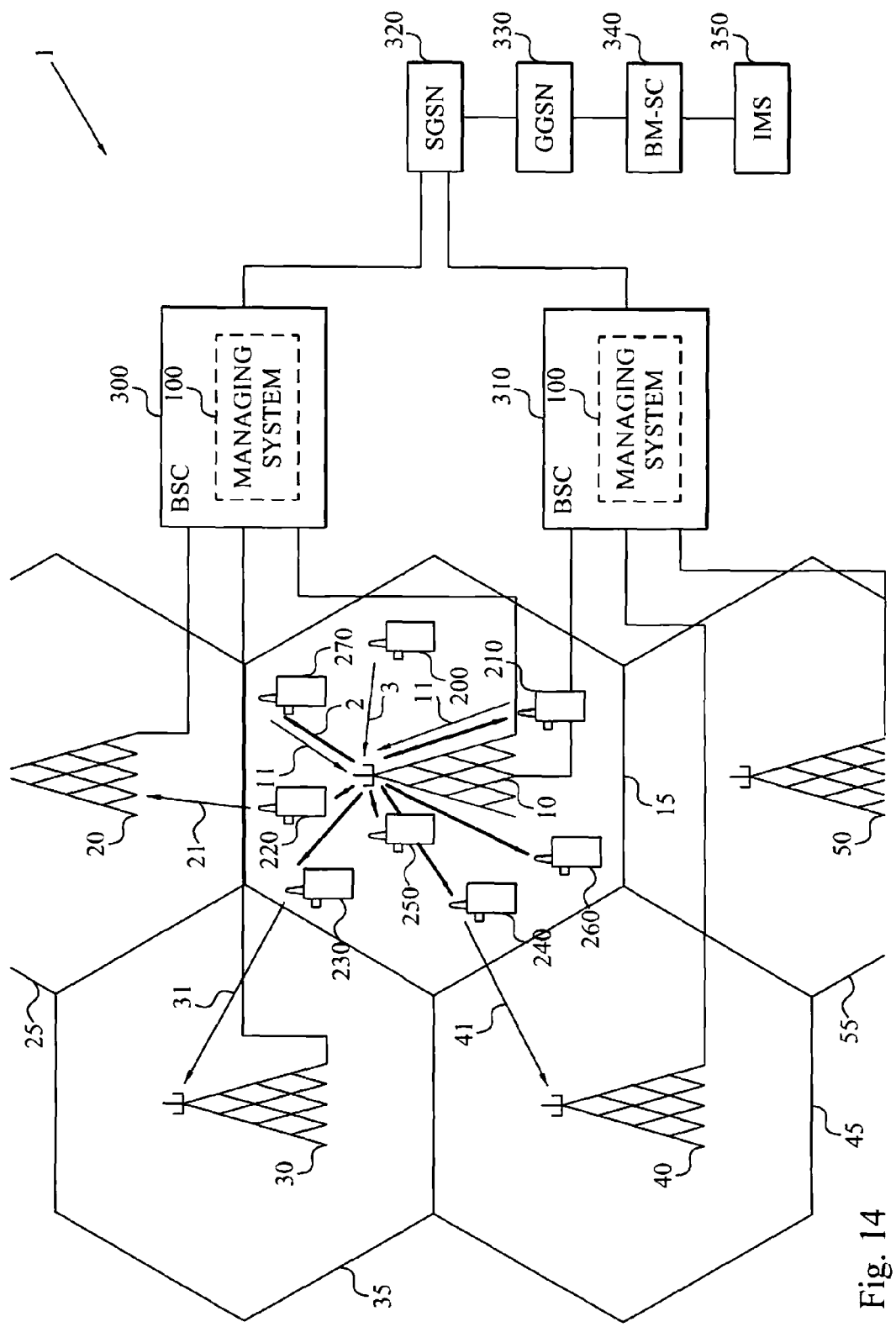
FIG. 14 illustrates an overview of a part of a communications system adopting the teachings of the present invention.

FIG. 14 is a schematic overview of a portion of a communication system 1, preferably a cellular radio-based communication system, employing the present invention. In this figure, a number of cells or radio-coverage areas 15, 25, 35, 45, 55 being served by respective base stations 10, 20, 30, 40, 50 are illustrated. The base stations 10, 20, 30, 40, 50 are in turn connected to and being managed by one or more BSCs 300, 310. The BSCs 300, 310 are connected to traditional support network nodes, such as SGSN 320 or GGSN 330. The Broadcast Multicast Service Center (BM-SC) node 340 is an MBMS data source that offers an interface between the core network nodes 320, 330 and a service provider, exemplified by an IMS server 350 in the figure.

A first cell 15 served by a first base station 10 of the system 1 contains multiple user terminals 200 to 270 participating in a communication session involving transmission of user data from the first base station 10 to the user terminals 210 to 270 using a common downlink channel 2. In the figure, this user data originates from the user terminal 200 that transmits the data on an assigned uplink channel 3 to the first base station 10.

In order to reduce the risk of blocking on the request channel 11 of the first base station 10 or cell 15, some of the user terminals 220, 230, 240 will, according to the invention, use corresponding request channels 21, 31, 41 of other neighboring base stations 20, 30, 40 and cells 25, 35, 45. Thus, following the common downlink broadcast/multicast, several of the user terminals 210, 220, 230, 240, 270 would like to respond, whereas other terminals 250, 260 remain silent. The user terminal 220 will send its uplink request message on the request channel 21 of a second base station 20, the terminal 230 uses the request channel 31 of a third base station 30 and the request channel 41 of a fourth base station 40 is employed by the user terminal 240. As a consequence, only two of the user terminal 210, 270 need to use the request channel 11 of the first base station 10 and therefore the blocking risk is reduced as compared to the case when all responding terminals 210, 220, 230, 240, 270 would use the same request channel 11.

A session managing system 100 according to the present invention and employed for selecting and informing user terminals 220, 230, 240 of assigned non-serving base stations 20, 30, 40 as candidate stations for any uplink request messages is provided in the communication system 1. In a first implementation, this system 100 is implemented in at least one of the BSC 300, 310 or in each such BSC 300, 310 as illustrated in the figure. In an alternative approach, at least a portion of the managing system 100 is provided in another network node 320, 330, 340, 350, including at least one of the base stations 10, 20, 30, 40, 50.

Figure 15:
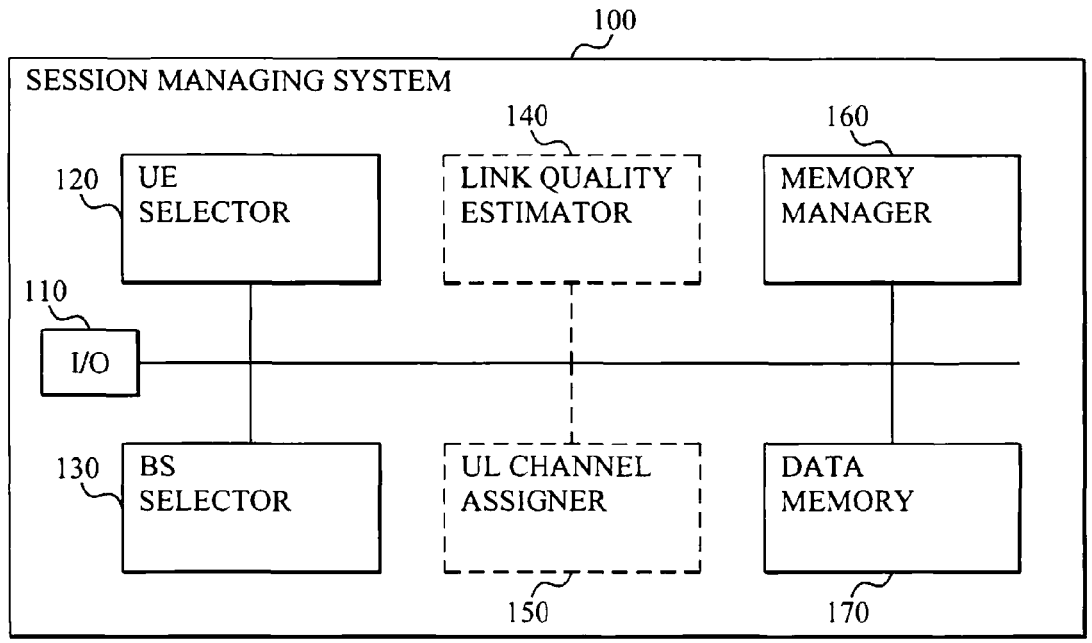
FIG. 15 is a schematic block diagram illustrating a session managing system according to the present invention.

FIG. 15 is a schematic block diagram of a session managing system 100 according to the present invention. This system 100 comprises a general input and output (I/O) unit 110 that collectively represents the different functionalities, such as transmitter/receiver, modulator/demodulator, encoder/decoder, used for transmitting and receiving data. The I/O unit 110 is in particular configured for notifying user terminals of which base station (request channel) to employ for transmission of uplink access requests.

The managing system 100 also comprises a user terminal selector 120. This selector 120 is arranged for selecting at least one user terminal of the multiple user terminals present in a first cell served by a (first) base station and involved in a communication session comprising transmission of user data on a common downlink channel from the base station to the multiple terminals. The terminal selector 120 can select one user terminal, a portion of the terminals present in the first cell or indeed all terminals of the first cell and participating in the session. Furthermore, if multiple other terminals are involved in the same session or another multi-terminal session of the invention and are present within the same radio-coverage area of another base station, the terminal selector 120 preferably performs a terminal selection among that or those terminal group(s). The terminal selector 120 can be operated in parallel on different terminal groups present in different cells of the system.

The selector 120 could determine a number of user terminals or a percentage of the multiple terminals that will use a request channel associated with another cell than the first cell. The particular user terminals actually selected for this task could then be more or less random as long as they together amounts up to the determined number or percentage. However, in a preferred implementation, not only the total number of the multiple user terminals is determined by the selector 120, but also the particular terminals. The selector 120 then preferably has access to identifiers of the different terminals present in the first cell and involved in the session. This information can be received from other nodes in the system by the I/O unit, such as from the communication service node. The information could also previously has been received from the external source and been entered, by a memory manager 160, in a local data memory 170 of the managing system. In such a case, the selector 120 retrieves the information from the memory 170 by means of the memory manager 160.

The selection operation performed by the terminal selector 120 could be static and performed once per communication session, such as in connection with the session set-up procedure or following the first downlink multicast/broadcast transmission. In a preferred approach, the selector 120 dynamically updates its terminal selection during the ongoing communication session. In such a case, the terminal selection can be performed in response to and be adaptive to changes in, for example, the number of participating user terminals, the positions of the user terminals and input selection parameters. For example, the communication session could be started with the terminals distributed through many different cells in the system. At this session start one or very few terminals are present in a same cell and the risk for uplink request collisions is low. However, as the session progresses the users move towards a location in the first cell. This means that over time the number of participating users present in the first cell will increase and therefore also the risk for uplink request collision. The terminal selector 120 of the invention can preferably reselect or make new updated terminal selections throughout the session to cope with this and other changes in the terminal positions/numbers during the session.

In the terminal selection, different parameters as previously described, could be input and used by the selector 120. For example, the total number of user terminals participating in the communication session or more preferably participating in the session and present within the first cell and optionally neighboring cells can be a suitable input parameter. This number is preferably requested or received by the I/O unit 110 from the communication service node.

Another suitable selector input parameter is an estimate of the number of expected uplink request message to be transmitted by the multiple user terminals of the first cell within a defined time period. This estimate and other statistics of the group session is typically collected and processed by the communication service node, or some other dedicated network node in the communication system. The estimate is then received by the I/O unit 110 and forwarded directly to the terminal selector 120 or first to the memory manager 160 for storage in the data memory 170. It could be possible that the I/O unit 110 receives new estimate updates from the external node. In such a case, such updates are preferably forwarded to the terminal selector 120 during operation to allow for a dynamic re-selection of user terminal during the ongoing communication session.

The managing system 100 may also, in an embodiment, contain a link quality estimator 140 that receives quality measurements from the user terminals and/or base stations in the system. The estimator 140 processes this input data for the purpose of determining estimates of interference or link quality parameters. For example, the estimator 140 could estimate an interference level caused by transmission of uplink request messages according to the prior art to the base station serving the first cell. If this interference level exceeds a maximum threshold (or the link quality of the request uplink channel of the first cell falls below a minimum threshold) as determined by the estimator 140, the selector 120 selects at least one user terminal that will transmit its uplink request messages using the request channel(s) of at least one other cell. Instead of having this quality estimator 140 in the managing system 100, the I/O unit 110 could receive the quality estimate from another network node or indeed from at least one user terminal.

A further selection input parameter that can be used by the terminal selector 120 is the identity of the user terminal that previously transmitted user data to the first base station for forwarding to the other terminals on the common downlink channel. This terminal or user identity in connection with previously recorded statistics can be used by the selector 120 as an estimate of the number of expected uplink requests that would typically follow during the next few seconds. The statistics from the service node would then specify, for the different terminal/user identifiers, the expected average number of responding terminals following a message from that identified terminal.

The data memory 170 of the managing system 100 can contain user prioritization information. This information could specify different user prioritization assigned to the members of the session and/or minimum quality of service guaranteed for the different members. This information is useful to the terminal selector 120 when deciding which particular terminals that should be allowed to use the request channel of the first cell or another request channel of another cell.

In a preferred embodiment, the managing system 100 also comprises a base station selector 130. This selector 130 is arranged for selecting at least one candidate or receiving base station from multiple available base stations. The at least one candidate base station will be the receiver of uplink access request messages from user terminals selected by the terminal selector 120.

The station selector 130 could perform a static base station selection that applies throughout the whole session. However, in a preferred approach, the selector 130 is configured for dynamically updating, if there is a need, the base station selection during the ongoing communication session. Such a need could arise due to a change in the position of the selected user terminals so that they are no longer able to communicate with the previously selected candidate base stations. Furthermore, the load situation in these candidate base stations may change over time so that they, at least during some period of time, are no longer able to serve user terminals for which they are not a so-called serving base station. As a consequence, the station selector 130 preferably performs a re-selection as the different input parameters change over time.

The different base stations in the communication system have each one or more assigned request channel to use for its connected user terminal when requesting uplink request. The base station selector 130 could alternatively, or in addition, be configured for selecting request channel to use by the user terminals selected by the terminal selector 120. However, since the selection of such a request channel inevitable results in a selection of a base station, the base station selection operation of the invention encompasses selection of request channel.

In a similarity to the user terminal selector 120, the base station selector 130 can use different input parameters, e.g. from the I/O unit 110 or from the data memory 170 by means of the memory manager 160, in the selection process. These selection parameters have been thoroughly described in the foregoing and but are briefly mentioned anew. Given a selected user terminal, there may be potential candidate base stations to select from. The quality estimator 140 of the managing system or an external quality estimator arranged in the user terminal or in another network node estimates a respective radio link quality for each communication link between the user terminal and the different potential candidate base stations. These link qualities are useful input to the station selector 130, which then can select a base station having at least a minimum required quality of the communication link to the user terminal.

The user terminal preferably comprises a monitored list of identifiers of base stations capable of communicating with the user terminals. These identifiers are preferably received from the terminal or from a network node managing such lists. The base station is then selected by the selector 130 from the stations present in the list. The monitored list can be complimented with load information from the different monitored base stations. This means that the station selector 130 can then select a base station from the list that have a rather low load and is therefore able to receive and process uplink requests from the user terminal.

In a further approach, the data memory 170 comprises cell topology information of the positions of the different base stations throughout the communication system. The station selector 130 then receives this information from the memory 170 using the memory manager 160. The information is used in connection with position information of the user terminal, as determined by the global positioning system (GPS), a triangulation procedure or some other terminal positioning operation. The station selector 130 can thereafter determine which base stations that are suitable candidate stations based on the relative distances between the stations and the user terminal.

The user terminals selected by the terminal selector 120 is informed through a notification from the transmitter chain of the I/O unit 110 of base station to use, as determined by the station selector 130, for any uplink access requests.

The receiver chain of the I/O unit 110 is preferably configured for receiving an uplink request message originating from a user terminal, especially if the system 100 is at least partly implemented in a base station. The request is forwarded from the I/O unit 110 to an uplink channel assigner 150. This channel assigner is arranged for assigning, based on the request message, an uplink channel to the user terminal for transmission of user data to the network. This channel assigner 150 could assign an uplink channel to the base station, to which the terminal has the common downlink channel (i.e. a base station different from the base station to which the terminal sent the request message). Alternatively, the assigner 150 assigns the uplink channel to the same base station as the terminal sent the uplink access request message. In a further approach, the assigner 150 actually assigns the uplink channel to a third base station, i.e. neither the base station to which the terminal has the common downlink channel nor the base station to which the terminal sent the uplink access request. In these two latter cases, the base station receiving the user data has to forward it to the base stations having a respective common downlink channel to the participating user terminals.

The transmitter chain of the I/O unit 110 informs the user terminal of the uplink channel selected by the channel assigner 150.

The units 110 to 160 of the session managing system 100 may be implemented or provided as software, hardware or a combination thereof. The units 110 to 170 may all be implemented in the managing system 100 in a single network node in a communications system. Alternatively, a distributed implementation is also possible and within the scope of the invention. In such a case, different units 110 to 170 of the managing 100 may be arranged in different network nodes but will despite this perform their intended operations as described in the foregoing. Examples of such network nodes include the base stations, BSC nodes, SGSN node, GGSN node, BM-SC node and IMS node illustrated in FIG. 14.

Figure 16:
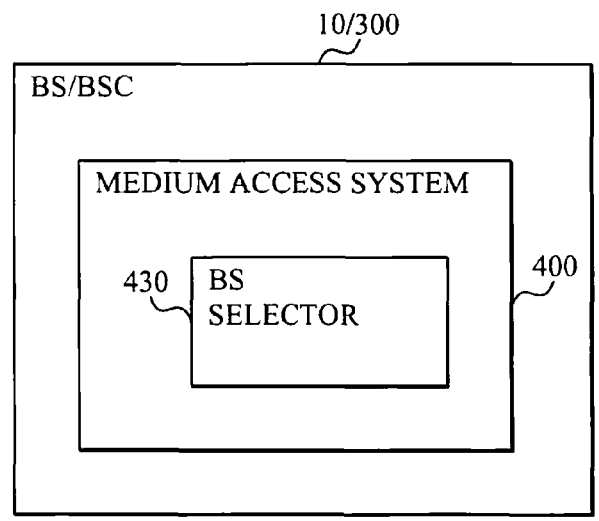
FIG. 16 is a schematic block diagram of a network node equipped with a medium access system according to the present invention.

FIG. 16 is a schematic block diagram of a network node, exemplified by a base station 10 or BSC 300, equipped with a medium access system 400 according to the invention. This access system manages uplink access for user terminals present in a first cell of the system together with other terminals that all participate in a communication session involving broadcasting or multicasting of user data on a common broadcast/multicast downlink channel in the first cell. The access system 400 comprises a base station selector 430 for selecting, for at least one of the user terminals, a base station serving a second different cell as receiving base station for an uplink request message originating from the at least one user terminal. This base station selector 430 basically corresponds to the selector of FIG. 15 described above. The discussion of that base station selector also applies to the station selector 430 of FIG. 16 and is not repeated herein.

The unit 430 of the medium access system 400 may be implemented or provided as software, hardware or a combination thereof. The unit 430 may be implemented in a single network node in a communications system. Alternatively, a distributed implementation is also possible and within the scope of the invention.

Figure 17:
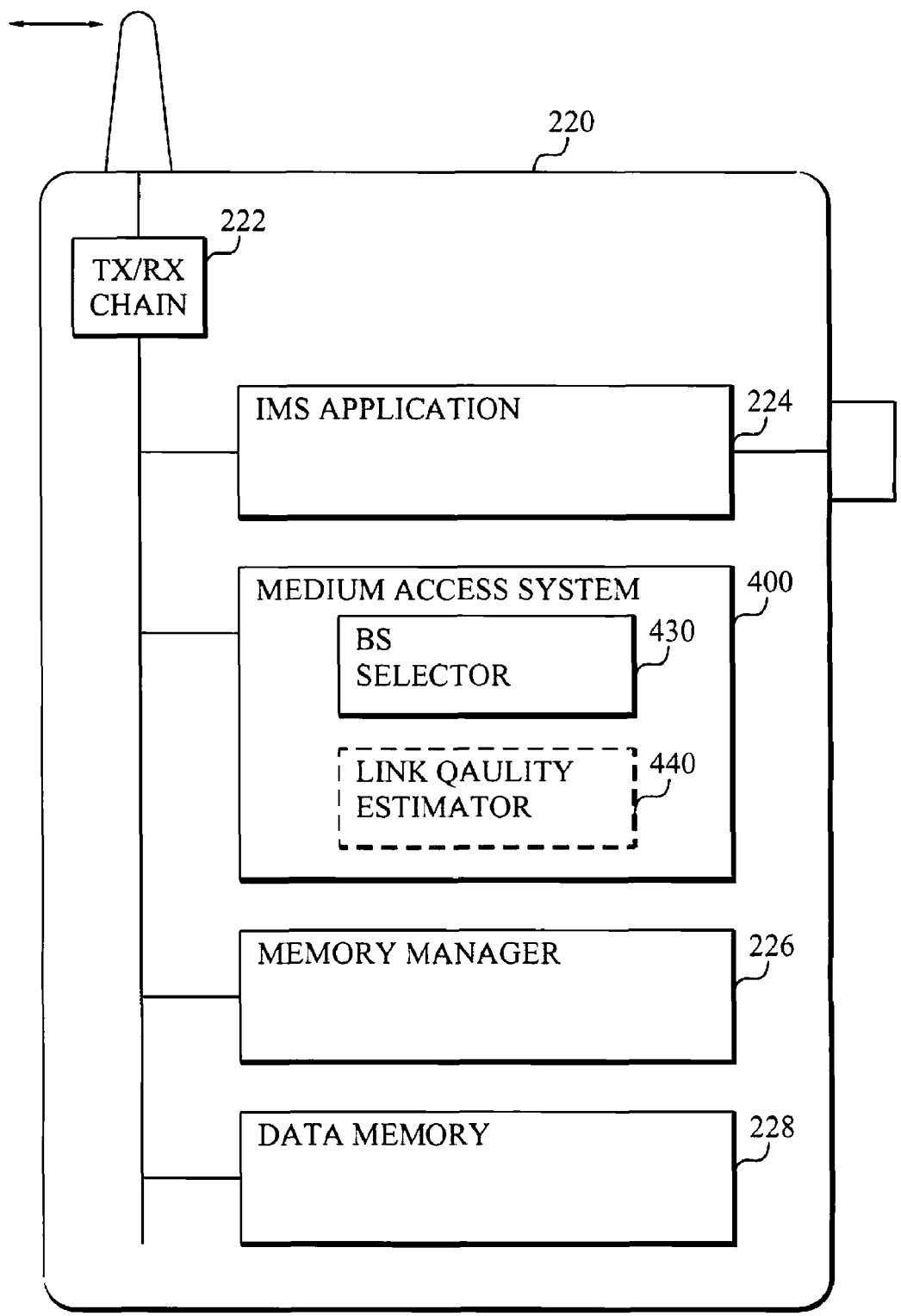
FIG. 17 is a schematic block diagram of a user terminal equipped with a medium access system according to the present invention.

FIG. 17 is a schematic block diagram of a user terminal 220 according to an embodiment of the invention. This user terminal 220 has been exemplified as a mobile telephone. However, other forms of mobile or stationary user terminals having functionality for wirelessly communicate with other user terminals in the communication system in a multi-user session through the use of base stations as data forwarding nodes are also within the scope of the invention. Such other terminals include computers, laptops, personal digital assistances, etc. equipped with a communication functionality and transmitter/receiver.

The user terminal 220 comprises a transmitter and a receiver chain 222 collectively illustrated as a single unit in the figure. This transmitter/receiver 222 is employed when communicating with other terminals in the session and in particular for unicasting user data and receiving broadcast/multicast data originating from other terminals. The transmitter/receiver 222 is also involved in the uplink medium access procedure of the invention.

The user terminal 220 comprises an IMS application 224, such as a PoC application, employed for the communication session of the invention. This application 224 compiles and processes data packets with user data generated, preferably, based on the recording of the voice of a user of the terminal 220. The application 224 is further able to process received data packets for the purpose of playing back the audio data carried therein on the terminal 220.

The user terminal 220 further comprises a medium access system 400 with a base station selector 430. This station selector 430 is employed by the terminal in connection with uplink access for selecting a base station, to which the transmitter 222 should send a compiled uplink access request. According to the invention, the station selector 430 selects to use the request channel associated with a cell different from the currently serving cell of the user terminal 220. As a consequence the receiving base station is then typically a base station different from the currently serving base station of the terminal 220.

The discussion of the base station selector in FIG. 15 also applies to this selector 430 implemented in the user terminal 220. For example, the different selection parameters mentioned in connection with FIG. 15 can also be employed by the station selector 430. For this reason, the access system 400 preferably comprises a link quality estimator 440 for determining quality estimates that can be used as input to the station selector 430. Correspondingly, a data memory 228 of the user terminal 220 preferably comprises identifiers of the base stations of the monitored set of the terminal 220. A memory manager 226, connected to the memory 228, can then retrieve these identifiers therefrom and forward them as input selection parameters to the station selector 430.

The units 222, 224, 226, 400, 430 and 440 of the user terminal 220 may be implemented or provided as software, hardware or a combination thereof.

It will be understood by a person skilled in the art that various modifications and changes may be made to the present invention without departure from the scope thereof, which is defined by the appended claims.

REFERENCES

[1] 3GPP TSG GSM/EDGE, "Radio Access Network, physical layer on the radio path, general description (Release 6)", TS 45.001 v6.7.0, November 2005.
[2] 3GPP TSG RAN, "High Speed Downlink Packet Access (HSDPA, overall description stage 2 (Release 6)", TS 25.308 v6.3.0, December 2004.
[3] 3GPP TSG Services and System Aspects, "IP Multimedia Subsystem (IMS) stage 2 (Release 6)", TS 23.228 v6.14.0, June 2006.
[4] OMA, OMA Push to talk Over Cellular V1.0 Approved Enabler, OMA-ERP-POC-V1_0-20060609-A, June 2006.
[5] 3GPP TSG RAN, "Introduction of the Multimedia Broadcast Multicast Service (MBMS) in the RAN Stage 2 (Release 6)", June 2006.
[6] 3GPP TSG GSM/EDGE, "Radio Access Network, Mobile interface layer 3 specification, Radio Resource Control (RRC) protocol (Release 6)", TS 44.018 v6.18.0, July 2006.
[7] IETF, "RTP: A Transport Protocol for Real-Time Applications", RFC 3550, July 2003.

The invention claimed is:

1. A method of managing a communication session involving multiple user terminals present in a first cell served by a base station of a cellular communication system and connected to said base station through a common downlink channel carrying user data, said method comprising instructing at least one of said multiple user terminals to transmit uplink request messages on an uplink channel of a base station serving a second cell, rather than said first cell, whereby collisions between substantially simultaneous uplink requests from said multiple user terminals can be reduced.

2. The method according to claim 1, further comprising the step of selecting said base station serving said second cell from multiple available base stations serving different cells in said cellular communication system.

3. An uplink access method for a communication session involving multiple user terminals present in a first cell served by a base station of a cellular communication system and connected to said base station through a common downlink channel carrying user data, said method comprising selecting an uplink channel of a base station serving a second cell, rather than said first cell, for an uplink request message originating from at least one of said multiple user terminals, whereby collisions between substantially simultaneous uplink requests from said multiple user terminals can be reduced.

4. The method according to claim 3, wherein said selecting step comprises selecting said base station serving said second cell from multiple available base stations serving different cells in said cellular communication system.

5. The method according to claim 2, wherein said selecting step comprises the steps of:
estimating a respective radio link quality for each communication link between said user terminal and said multiple available base stations; and,
selecting said base station serving said second cell from said multiple available base stations based at least partly on said estimated radio link qualities.

6. The method according to claim 2, wherein said selecting step comprises selecting said base station serving said second cell from said multiple available base stations based at least partly on information of base stations present in a monitored set of said user terminals, said monitored set comprising information of base stations capable of communicating with said user terminals.

7. The method according to claim 6, further comprising providing load information descriptive of a respective load of said base stations present in said monitored set and said selecting step comprises selecting said base station serving said second cell from said multiple available base stations based at least partly on said load information.

8. The method according to claim 2, wherein said selecting step comprises selecting said base station serving said second cell from said multiple available base stations based at least partly on information of a cell topology of said cellular communication system.

9. The method according to claim 1, wherein said common downlink channel carries user data originating from a transmitting user terminal being a member of said communication session.

10. The method according to claim 1, wherein said common downlink channel is a multicast or a broadcast downlink channel carrying user data originating from a transmitting user terminal.

11. The method according to claim 1, further comprising selecting said user terminal from said multiple user terminals.

12. The method according to claim 11, wherein said user terminal selecting step comprises selecting said user terminal from said multiple user terminals based at least partly on a number of user terminals involved in said communication session.

13. The method according to claim 11, wherein said user terminal selecting step comprises selecting said user terminal from said multiple user terminals based at least partly on an estimate of a number of expected uplink request messages to be transmitted by said multiple user terminals within a defined time period.

14. The method according to claim 11, further comprising estimating an interference level caused by transmission of multiple uplink request messages to said base station serving said first cell, and said user terminal selecting step comprises selecting said user terminal from said multiple user terminals based at least partly on said estimated interference level.

15. The method according to claim 11, wherein said user terminal selecting step comprises selecting said user terminal from said multiple user terminals based at least partly on an identity of said transmitting user terminal.

16. The method according to claim 11, wherein said user terminal selecting step comprises selecting said user terminal from said multiple user terminals based at least partly on a user prioritization assigned to said user terminal.

17. The method according to claim 1, further comprising the steps of:
receiving, at said base station serving said second cell, said uplink request message originating from said user terminal; and,
assigning, based on said uplink request message, an uplink channel to said user terminal for data transmission to said base station serving said first cell.

18. The method according to claim 1, further comprising the steps of:

receiving, at said base station serving said second cell, said uplink request message originating from said user terminal; and, assigning, based on said uplink request message, an uplink channel to said user terminal for data transmission to said base station serving said second cell.

19. A session managing system, comprising:

a user terminal selector arranged for selecting a user terminal of multiple user terminals present in a first cell served by a base station of a cellular communication system and involved in a communication session comprising transmission of user data on a common downlink channel to said multiple user terminals; and, a transmitter connected to said selector for transmitting instructions to said user terminal selected by said selector to transmit uplink request messages on an uplink channel of a base station serving a second cell, rather than said first cell, whereby collisions between substantially simultaneous uplink requests from said multiple user terminals can be reduced.

20. The system according to claim 19, wherein said user terminal selector is arranged for selecting said user terminal from said multiple user terminals based at least partly on a number of user terminals involved in said communication session.

21. The system according to claim 19, wherein said user terminal selector is arranged for selecting said user terminal from said multiple user terminals based at least partly on an estimate of a number of expected uplink request messages to be transmitted by said multiple user terminals within a defined time period.

22. The system according to claim 19, wherein said user terminal selector is arranged for selecting said user terminal from said multiple user terminals based at least partly on an estimated interference level caused by transmission of multiple uplink request messages to said base station serving said first cell.

23. The system according to claim 19, wherein said user terminal selector is arranged for selecting said user terminal from said multiple user terminals based at least partly on an identity of said transmitting user terminal.

24. The system according to claim 19, wherein said user terminal selector is arranged for selecting said user terminal from said multiple user terminals based at least partly on a user prioritization assigned to said user terminal.

25. The system according to claim 19, further comprising:

a receiver for receiving said uplink request message originating from said user terminal;

a channel assigner connected to said receiver for assigning, based on said uplink request message, an uplink channel to said user terminal for data transmission to said base station serving said first cell; and, a transmitter connected to said channel assigner for transmitting a notification of said assigned uplink channel to said user terminal.

26. The system according to claim 19, further comprising:

a receiver arranged for receiving said uplink request message originating from said user terminal;

a channel assigner connected to said receiver for assigning, based on said uplink request message, an uplink channel to said user terminal for data transmission to said base station serving said second cell; and, a transmitter connected to said channel assigner for transmitting a notification of said assigned uplink channel to said user terminal.

27. The system according to claim 19, further comprising a base station selector arranged for selecting said base station serving said second cell from multiple available base stations serving different cells in said cellular communication system.

28. An uplink access system, comprising a base station selector arranged for selecting, for a user terminal of multiple user terminals present in a first cell served by a base station of a cellular communication system and involved in a communication session comprising transmission of user data on a common downlink channel to said multiple user terminals, an uplink channel of a base station serving a second cell, rather than said first cell, for uplink request messages originating from said user terminal, whereby collisions between substantially simultaneous uplink requests from said multiple user terminals can be reduced.

29. The system according to claim 28, wherein said base station selector is arranged for selecting said base station serving said second cell from multiple available base stations serving different cells in said cellular communication system.

30. The system according to claim 27, wherein said base station selector is arranged for selecting said base station serving said second cell from said multiple available base stations based at least partly on estimates of a respective radio link quality for each communication link between said user terminal and said multiple available base stations.

31. The system according to claim 27, wherein said base station selector is arranged for selecting said base station serving said second cell from said multiple available base stations based at least partly on information of base stations present in a monitored set of said user terminal, said monitored set comprising information of base stations capable of communicating with said user terminal.

32. The system according to claim 27, wherein said base station selector is arranged for selecting said base station serving said second cell from said multiple available base stations based at least partly on information of a cell topology of said cellular communication system.

33. A network node comprising a session managing system according to claim 19.

34. A user terminal comprising an uplink access system according to claim 28.

* * * * *

UNITED STATES PATENT AND TRADEMARK OFFICE
CERTIFICATE OF CORRECTION

PATENT NO.       : 8,081,975 B2                                    Page 1 of 1
APPLICATION NO.  : 12/517170
DATED            : December 20, 2011
INVENTOR(S)      : Hannu et al.

It is certified that error appears in the above-identified patent and that said Letters Patent is hereby corrected as shown below:

In the Specifications:

In Column 5, Line 66, delete "0.25" and insert -- 0.25 s --, therefor.

Signed and Sealed this
Fourteenth Day of February, 2012

David J. Kappos
*Director of the United States Patent and Trademark Office*